US010545245B2

(12) United States Patent
Ying et al.

(10) Patent No.: US 10,545,245 B2
(45) Date of Patent: Jan. 28, 2020

(54) GNSS JAMMING SIGNAL DETECTION

(71) Applicant: Nottingham Scientific Limited, Nottingham (GB)

(72) Inventors: Yeqiu Ying, Nottingham (GB); Timothy Christopher Whitworth, Nottingham (GB); Kevin Sheridan, Nottingham (GB)

(73) Assignee: Nottingham Scientific Limited, Nottingham (GB)

( * ) Notice: Subject to any disclaimer, the term of this patent is extended or adjusted under 35 U.S.C. 154(b) by 243 days.

(21) Appl. No.: 15/511,970

(22) PCT Filed: Sep. 16, 2015

(86) PCT No.: PCT/GB2015/052682
§ 371 (c)(1),
(2) Date: Mar. 16, 2017

(87) PCT Pub. No.: WO2016/042325
PCT Pub. Date: Mar. 24, 2016

(65) Prior Publication Data
US 2017/0261615 A1  Sep. 14, 2017

(30) Foreign Application Priority Data

Sep. 16, 2014  (GB) .................................. 1416365.3

(51) Int. Cl.
*G01S 19/21* (2010.01)
*H04K 3/00* (2006.01)
(52) U.S. Cl.
CPC ................ *G01S 19/21* (2013.01); *H04K 3/22* (2013.01); *H04K 3/42* (2013.01); *H04K 3/90* (2013.01)

(58) Field of Classification Search
CPC . G01S 19/21; H04K 3/22; H04K 3/42; H04K 3/90
(Continued)

(56) References Cited

U.S. PATENT DOCUMENTS 5,128,679 A  *  7/1992  Moffat .................. G01R 23/16
                                                    342/13
6,407,699 B1     6/2002  Yang
(Continued)

FOREIGN PATENT DOCUMENTS

CN         101526566 A        9/2009
CN         103078661 A  *     5/2013
(Continued)

OTHER PUBLICATIONS

Tong et al. (Jul. 1, 2011) "Lone Sentinel: Single-Receiver Sensitivity to RF Interference," GPS World Paper. [Accessible on the Internet at URL: http://gpsworld.com/gnss-systemsignal-processinglone-sentinel-11844/], 8 pages.
(Continued)

*Primary Examiner* — Harry K Liu
(74) *Attorney, Agent, or Firm* — Lathrop Gage LLP

(57) ABSTRACT

Methods and apparatus for detecting, geo-locating and/or classifying a GPS or GNSS jamming signal are disclosed. One such method comprises the steps of analysing a spectrogram of the jamming signal using a tree-based decision process and as a result, then selecting one of a number of types of jamming signal, wherein one of the decisions (1103) in the tree is whether the spectrogram has spectral periodicity.

17 Claims, 20 Drawing Sheets

(58) Field of Classification Search
USPC .................................................. 342/357.59
See application file for complete search history.

(56) References Cited

U.S. PATENT DOCUMENTS

| | | | |
|---|---|---|---|
| RE37,802 E * | 7/2002 | Fattouche | H04B 1/707 370/209 |
| 7,778,367 B1 | 8/2010 | Stockmaster | |
| 2008/0084330 A1 * | 4/2008 | Picard | G01D 4/004 340/870.02 |
| 2013/0310068 A1 * | 11/2013 | Fischer | G01S 19/05 455/456.1 |
| 2014/0086374 A1 | 3/2014 | Joo et al. | |

FOREIGN PATENT DOCUMENTS

| | | |
|---|---|---|
| CN | 103399324 A | 11/2013 |
| EP | 0954119 A2 | 11/1999 |
| EP | 1862816 A1 | 12/2007 |
| EP | 2662706 A1 | 11/2013 |
| EP | 2846174 A1 | 3/2015 |
| GB | 2521246 A | 6/2015 |
| JP | 2010081404 A2 | 4/2010 |
| JP | 2013047642 A | 3/2013 |
| WO | 2011/065559 A1 | 6/2011 |

OTHER PUBLICATIONS

Wendel et al. (2012) "An interference monitoring system for GNSS reference stations," Satellite Navigation Technologies and European Workshop on GNSS Signals and Signal Processing (NAVITEC), 6th ESA Workshop, 7 pages.
Search Report corresponding to Great Britain Patent Application No. GB1416365.3, dated Feb. 26, 2015, 1 page.
Search Report corresponding to Great Britain Patent Application No. GB1416365.3, dated Jun. 29, 2015, 4 pages.
International Preliminary Report of Patentability corresponding to International Patent Application No. PCT/GB15/52682, dated Mar. 21, 2017.
International Search Report corresponding to International Patent Application No. PCT/GB15/52682, dated Mar. 11, 2016.
Japanese Patent Application No. 2017-535150, English translation of Office Action dated Jul. 30, 2019, 2 pages.

* cited by examiner

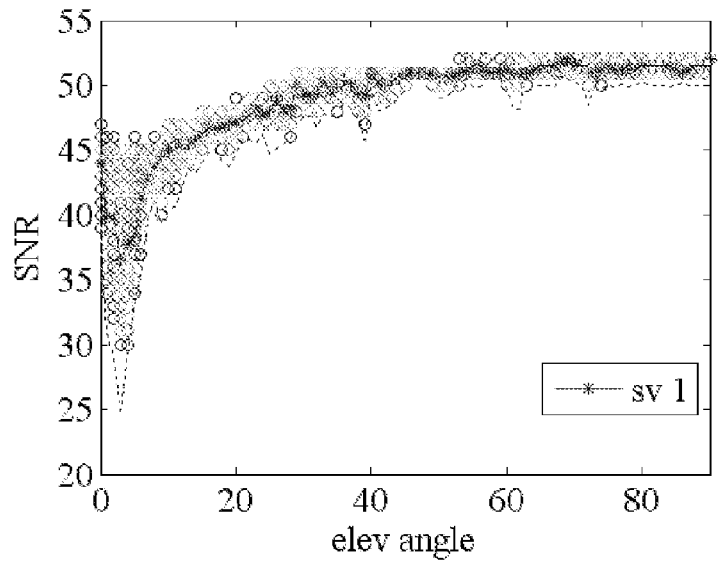

Figure 8b

| Test | power abs. | power diff. | spectrum abs. | spectrum diff. | measure abs. | measure diff |
|---|---|---|---|---|---|---|
| Input | $x_i[n]$ | $x_i[n]$ | $x_i[n]$ | $x_i[n]$ | $R_i[s]$ $E_i[s]$ | $R_i[s]$ $E_i[s]$ |
| Reference | $P_{ref}$ | $\widetilde{P}_{i-d}$ | $X_{ref}(f_k)$ | $X_{i-d}(f_k)$ | $CN_0(el)$ | $\widetilde{R}_{i-d}[s]$ |
| Threshold | $\lambda_i^{PA}$ | $\lambda_i^{PD}$ | $\lambda_i^{SA}(f_k)$ | $\lambda_i^{SD}$ | $\lambda_i^{MA}(el)$ | $\lambda_i^{MD}$ |
| Compute | $P_i, \widetilde{P}_i$ | $P_i$ | $X_i(f_k)$ | $X_i(f_k)$ $\sigma_i(f_k)$ $T_i(f_k)$ | $\widetilde{R}_i[s]$ $F_i^A$ | $F_i^D$ |
| Buffer val.s | $P_i \; \widetilde{P}_i$ | | $X_i(f_k) \; \sigma_i(f_k)$ | | $R_i[s] \; \widetilde{R}_i[s]$ | |
| Conf. function | $g()$ | $g()$ | $g()$ | $g()$ | $h[]$ | $h[]$ |
| Output | $C_i^{PA}$ | $C_i^{PD}$ | $C_i^{SA}$ | $C_i^{SD}$ | $C_i^{MA}$ | $C_i^{MD}$ |

Figure 9

| | Spectrally periodic | Time periodic | Frequency varying | Freq. jumps (not sweeps) | Power varying |
|---|---|---|---|---|---|
| WB noise | ✗ | ✗ | ? | ? | ✗ |
| NB noise | ✗ | ? | ? | ? | ✗ |
| ST | ✗ | ✓ | ? | ? | ✗ |
| CDMA | ? | ✓ | ✗ | ? | ✗ |
| Pulsed WB | ✓ | ✗ | ✗ | ? | ✓ |
| Pulsed NB | ✓ | ✗ | ✗ | ? | ✓ |
| Pulsed ST | ✓ | ✗ | ✗ | ? | ✓ |
| Pulsed CDMA | ✓ | ✓ | ✗ | ? | ✓ |
| Chirp sawtooth | ✓ | ? | ✓ | ✗ | ✗ |
| Chirp triangle | ✓ | ? | ✓ | ✗ | ✗ |
| Chirp multi/other | ✓ | ? | ✓ | ✗ | ✗ |
| Pulsed chirp sawtooth | ✓ | ? | ✓ | ✗ | ✓ |
| Pulsed chirp triangle | ✓ | ? | ✓ | ✗ | ✓ |
| Pulsed chirp other | ✓ | ? | ✓ | ✗ | ✓ |
| Freq. hopped | ✓ | ✓ | ✓ | ✓ | ✗ |
| Sporadic freq. hopped | ✓ | ✓ | ✓ | ✓ | ✓ |

Figure 10

GNSS JAMMING SIGNAL DETECTION

FIELD OF THE INVENTION

The present invention concerns the field of detecting and classifying GNSS jamming signals (or Radio Frequency Interference (RFI)). More particularly, but not exclusively, this invention concerns a method of detecting a GNSS jamming signal, a method of classifying a GNSS jamming signal, and a method of geo-locating a GNSS jamming signal. The invention also concerns computer processors and software therefor for performing such methods. The invention also concerns a GNSS jamming signal detector.

BACKGROUND OF THE INVENTION

In recent years, GNSS has been included in a rapidly increasing number of applications in various sectors, including those regarded to be critical as they concern safety and financial transactions. A major threat to the widespread adoption and use of GNSS is its vulnerability to signal interference and jamming, which can severely degrade the GNSS service and impact performance. Effects range from a loss of accuracy to complete denial of GNSS services. The threat of unintentional RFI has been recognized for some time and becomes greater with an increasingly crowded RF spectrum and ever more devices using these frequencies. Intentional jamming is an increasing problem due to the low cost and wide availability of civilian jammers such as so called personal privacy protection device (PPD).

There is a desire and/or need for the provision of an effective means of detecting for the presence of a GNSS jamming signal, whether resulting from intentional or unintentional signals. Such jamming signals will typically be RF signals (RF Interference or "RFI"). It would be desirable for any such detector of a GNSS jamming signal to be capable of classifying the GNSS jamming signal and determining its likely location. Knowing the type and location of the interference source may lead to more suitable and effective mitigation actions.

There are different GNSS RFI detectors in the public domain which suffer from disadvantages that render such detectors as inadequate for the purposes of GNSS jamming signal detection and/or classification and/or which can otherwise be improved. One such GNSS RFI receiver (as discussed in the GPS World paper entitled "Lone Sentinel: Single-Receiver Sensitivity to RF Interference"—available from http://gpsworld.com/gnss-systemsignal-processinglone-sentinel-11844) relies on the measurements from commercial off the shelf (COTS) GPS/GNSS receivers, in that the RFI detection is based on the receiver estimated signal-to-noise-ratio (SNR) [or equivalently the carrier-to-noise-density (CN0)]. A first drawback of this type of technique is caused by the limited transparency and the variation of the COTS receivers' proprietary designs. In order to cope with this variation, the jamming signal detection algorithms have to loosen the detection criteria to tolerate this variation. A second drawback of this type of technique is that the SNR or CN0 is usually estimated after the GNSS correlation stage and is usually filtered in order to reduce the noise of the estimate. This process reduces the sensitivity of the detection and introduces a delay that is proportional to the filter time constant. Such a receiver is also unable to provide sufficient information or data for detailed classification of the jamming signal to be effected.

Measurements such as tracking loop loss of lock indicator, code and carrier coherence, and automatic gain control (AGC) measurements have each also been proposed as alternative means for enabling GNSS jamming signal detection. But these techniques encounter similar drawbacks as the ones relying on the SNR or CN0.

Another drawback with the use of certain metrics for detecting RFI is that some such metrics may vary due to factors which are not related to interference. GNSS signal strengths vary depending on the local operating environments, with satellite signals being reflected, diffracted and completely obscured. If a system only takes into account CN0, or the numbers of satellites tracked, for example, it is not possible to determine if the cause of any degradation is RFI.

Another type of system proposed (see for example, the paper by Wende, J.; Kurzhals, C.; Houdek, M.; Samson, J., "An interference monitoring system for GNSS reference stations," Antenna Technology and Applied Electromagnetics (ANTEM), 2012 15th International Symposium on, vol., no., pp. 1, 5, 25-28 Jun. 2012) for detecting GNSS jamming signal is a COTS real-time spectrum analyser. Such a spectrum analyser could be used to monitor and characterize the RFI by performing continuous spectrum analyses. Benefiting from a powerful spectrum analysing capability, such a system may offer better sensitivity compared to the techniques mentioned above. However, although more powerful, such a real-time spectrum analyser is very expensive and is more sophisticated in many ways that are of no use for detecting GNSS jamming signals. Indeed, most of the functionalities of such a COTS spectrum analyzer are not needed for GNSS jamming signal detection. The integration of such a COTS spectrum analyzer into an easy-to-use and practical GNSS jamming signal detection system is not a trivial task. Such a COTS spectrum analyzer may thus be limited in its application to one-off surveys of a specific site where a period of data can be captured and analyzed later manually. Such a COTS spectrum analyzer is not a cost-effective or practical solution for the majority of desired applications.

Various academic papers have been presented on the subject of GNSS RFI detection and characterisation but such papers fail to provide sufficient details to enable a person skilled in the art to manufacture a fully operational GNSS RFI detector without further details and/or without expending further inventive activity.

The present invention seeks to mitigate one or more of the above-mentioned problems/disadvantages. Alternatively or additionally, the present invention seeks to provide an improved method of detecting a GNSS jamming signal. Alternatively or additionally, the present invention seeks to provide an improved method of classifying a GNSS jamming signal. Alternatively or additionally, the present invention seeks to provide an improved method of geo-locating a GNSS jamming signal. Alternatively or additionally, the present invention seeks to provide an improved GNSS jamming signal detector.

SUMMARY OF THE INVENTION

According to a first aspect of the invention there is provided a method of classifying a GNSS jamming signal (or RFI signal) comprising the following steps: analysing a spectrogram of the jamming signal using a tree-based decision process and as a result, then selecting one of a finite number of types of jamming signal, wherein one of the decisions in the tree is whether the spectrogram has spectral periodicity.

According to a second aspect of the invention there is provided a method of detecting a GNSS jamming signal at a detector comprising the following steps:

calculating a plurality of confidence values representing the confidence of detection of a jamming signal, the confidence values being based on four or more of the following tests:

(i) a test comparing an indication of the absolute power of the signal received at the detector, across the entire bandwidth of the detector, over a given time window and a threshold power level, (ii) a test comparing an indication of the rate of change of the power of the signal received at the detector, across the entire bandwidth of the detector, over a given time window and a threshold rate of change of power, (iii) a test comparing the measured power of the signal received at the detector, over each of all the given frequency bands, which has a narrow bandwidth and is centred on a given frequency, over a given time window and a threshold power level associated with that given frequency band, (iv) a test comparing the rate of change of the measured power of the signal received at the detector, over a given frequency band which has a narrow bandwidth and is centred on a given frequency, over a given time window and a threshold rate of change of power associated with that given frequency band, (v) a test comparing an output of a GNSS receiver forming at least part of the detector, the output representing the quality of geolocation data received or produced by the GNSS receiver, and a threshold level of quality, and (vi) a test comparing the rate of change in an output of a GNSS receiver forming at least part of the detector, the output representing the quality of geolocation data received or produced by the GNSS receiver, and a threshold rate of change of quality, calculating a global decision on whether or not to deem detection of a jamming signal on the basis of a combination of at least three of the following calculations:

(a) in a case where both tests (i) and (ii) are performed, a combination of the confidence values resulting from tests (i) and (ii), (b) in a case where both tests (iii) and (iv) are performed, a combination of the confidence values resulting from tests (iii) and (iv), (c) in a case where both tests (v) and (vi) are performed, a combination of the confidence values resulting from tests (v) and (vi), (d) in a case where two or three of tests (i), (iii) and (v) are performed, a combination of the confidence values resulting from the two or three of those tests that are so performed, and (e) in a case where two or three of tests (ii), (iv) and (vi) are performed, a combination of the confidence values resulting from the two or three of those tests that are so performed.

According to a third aspect of the invention there is provided a method of detecting and geo-locating a GNSS jamming signal comprising the following steps:

providing at least one fixed position signal detector arranged to detect the presence of a GNSS jamming signal, on detection of the presence of a jamming signal as detected by the fixed position signal detector, dispatching a mobile signal detector, using the mobile signal detector at a plurality of different locations to make measurements of one or more characteristics of the jamming signal, and the mobile signal detector providing feedback to a manual operator enabling the operator to determine the location of the source of the jamming signal.

According to a fourth aspect of the invention there is provided a method of detecting a GNSS jamming signal at a detector comprising the following steps: receiving an analogue signal representative of the power of a radio frequency signal, converting the analogue signal into a quantised digital signal in which the power at a given instant is represented by means of a digital value, calculating a digital power quantity from a stream of digital values received over a measurement window, for that measurement window calculating a threshold value which takes into account a quantisation model, sample variance for the number of measurements made in that particular measurement window and environmental variance in respect of that particular measurement window, and calculating a jamming signal detection parameter based on the digital power quantity and the threshold value so calculated.

According to a fifth aspect of the invention there is provided a method of classifying a GNSS jamming signal in which one of a finite number of types of jamming signal is selected as classifying the GNSS jamming signal, the method comprising a step of analysing a spectrogram of the jamming signal, in order to distinguish between one or more types of jamming signal from one or more different types, by shifting different parts of the spectrogram by different amounts along the time axis, in an attempt to group signal components in the time domain.

According to a sixth aspect of the invention there is provided a GNSS jamming signal detector comprising a GNSS signal antenna, a GNSS receiver, and a computer processor with associated software that when executed on the processor causes the detector to perform those steps performed by the computer processor as described or claimed herein in relation to any aspect of the method or apparatus of the present invention.

According to a seventh aspect of the invention there is provided a network of detectors, each such detector being as described or claimed herein in relation to any aspect of the method or apparatus of the present invention, and each being arranged to communicate with at least one of a central server and another detector in the network.

According to an eighth aspect of the invention there is provided a computer software product that when executed on a processor of a GNSS detector causes the detector to perform those steps as are performed by the computer processor as described or claimed herein in relation to any aspect of the method or apparatus of the present invention.

According to an ninth aspect of the invention there is provided a central server programmed to control and communicate with a network of detectors as described or claimed herein in relation to any aspect of the method or apparatus of the present invention.

According to an tenth aspect of the invention there is provided a computer software product that when executed on a computer server perform the function of the server as described or claimed herein in relation to any aspect of the method or apparatus of the present invention.

It will of course be appreciated that features described in relation to one aspect of the present invention may be incorporated into other aspects of the present invention. For example, the method of the invention may incorporate any of the features described with reference to the apparatus of the invention and vice versa.

DESCRIPTION OF THE DRAWINGS

Embodiments of the present invention will now be described by way of example only with reference to the accompanying schematic drawings of which:

FIG. 8b shows an exemplary graph of the measured signal to noise ratio against the elevation of the measured GPS satellite;

FIG. 9 shows a summary of the six detection algorithms;

FIG. 10 shows a table of RFI types and their corresponding characteristics;

DETAILED DESCRIPTION

Figure 1:
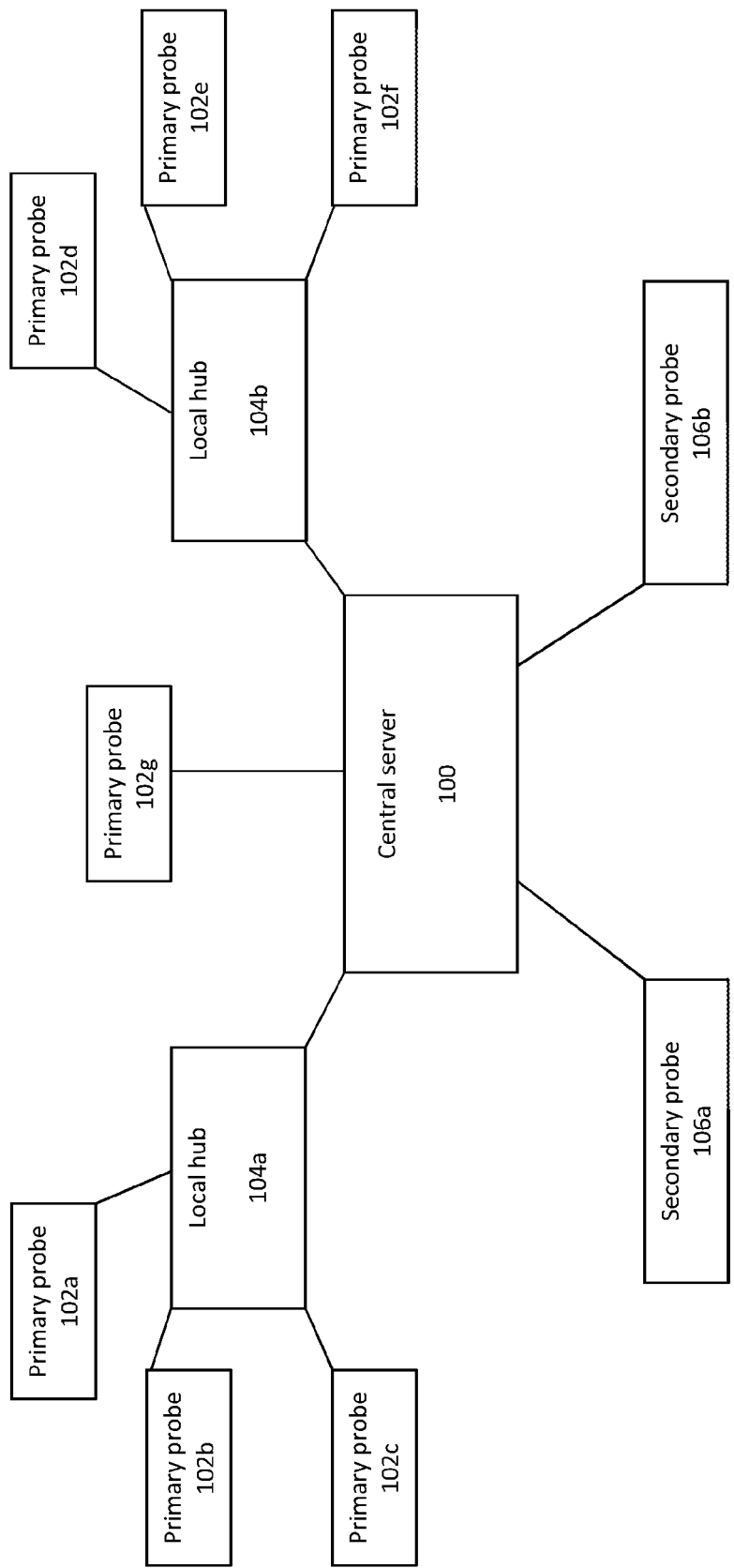
FIG. 1 shows a system of fixed position signal detectors (primary probes), mobile signal detectors (secondary probes), local hubs and a central server according to a first embodiment of the invention.

Certain embodiments of the invention concern a method of classifying a GNSS jamming signal. Such a method may comprise a step of analysing a spectrogram of the jamming signal. The analysis may include using a tree-based decision process. One of the decisions in the tree may be whether the spectrogram has spectral periodicity. Performing such a step has the potential advantage of providing a strong and clear distinction between one group of types of jamming signal and another group of types of jamming signal, with a high degree of accuracy. Use of such a method may result in a process efficient means of classifying a GNSS jamming signal, resulting in time and/or power savings. The decision may divide all possible types of a finite and complete set of types (for example pre-set classes) of jamming signal into two, and only two, distinct sub-sets of the complete set. One of a finite number of types (or classes) of jamming signal may be selected following such analysis, which may include making other subsequent decisions. It will therefore be understood that the step of classifying a GNSS jamming signal may result in the detected GNSS jamming signal being characterised as having certain characteristics that are consistent with one or more different classes of GNSS jamming signal. The method may be such that any detected signal that is deemed to be a GNSS jamming signal can be classified as belonging to one (or more) of the finite number of classes. One of the classes may be representative of the signal not being able to be classified in any other class, but it is preferred that there is no such "miscellaneous" class. The spectrogram may comprise information concerning the signal detected across the time domain. The spectrogram may comprise information concerning the signal detected across the frequency domain. The spectrogram may comprise information concerning the power of the signal detected. The spectrogram may comprise information concerning the power of the signal detected at a given frequency, or the average power over a range of frequencies. The spectrogram may comprise information concerning the power of the signal detected at a given time, or the average power over a time period. The power information may be in the form of an indication of amplitude of signal, for example peak-to-peak amplitude and/or root-mean-square (RMS) value of the signal amplitude. The spectrogram may be in the form of a two dimensional matrix (for example a table or an array) of power values with one dimension representing signal frequency and the other dimension representing time. The spectrogram may comprise one or more analogue representations of the signal, but it is preferred from the spectrogram to be digitally represented. In the case where the spectrogram is in the form of a matrix, it may be considered as comprising cells of values, for example power values, arranged in rows and columns such representing frequency and time axes.

There may be a step of modifying the spectrogram prior to using it in the spectral periodicity decision. The modifying step may include stripping out instances of low power in the spectrogram. The modifying step may include detecting and stripping out low power frequency bands. The modifying step may include detecting and stripping out individual power values. For example, any line (whether a column or a row i.e. whether in the time domain or in the frequency domain), group of lines, cell or group of cells, of the spectrogram which has power values meeting a given criteria may be reset to zero. For example, if a cell in the spectrogram when in the form of a matrix is lower than a pre-set threshold the value in the cell may be set to zero. If a group of cells (a column or row for example) has an average power of less than a threshold value, all of the cells in the group may be set to zero. Such a low power removal step may reduce noise in the spectrogram. The modifying step may alternatively, or additionally, include a step of auto-correlating the spectrogram, for example in the time domain. Such an auto-correlated value may be further modified by removing the initial peak at zero time-lag. Such an auto-correlated value may be further modified by removing a DC term representative of spectrogram frequency components that do not change over time (e.g. single tone), or change randomly over time (e.g. white noise).

There may be a step of Fourier Transforming the auto-correlation of the spectrogram so as to transform time domain information into frequency domain information. Such a step may assist in determining the periodicity, if any, of the frequency variation of the signal over time. The Fourier Transformed spectrogram may be analysed to detect whether there are significant peaks in the spectral periodicity, for example one or more peaks above a certain predetermined threshold.

If it is decided that the spectrogram has spectral periodicity there may then be a step of testing for frequency variation. If it is decided that the spectrogram does not have spectral periodicity it may then be the case that no step of testing for frequency variation is performed. There may thus be a decision of whether or not to test for frequency variation on the basis of the result of the test of whether the spectrogram has spectral periodicity or not. Making such a decision may improve the efficiency of classifying the GNSS jamming signal as it may render unnecessary the test for frequency variation.

It may be that the method is performed such that if the result of the decision on whether the spectrogram has spectral periodicity is that it does have spectral periodicity a step of testing for whether the signal is pulsed/power varying is performed, whereas that if the result of the decision on whether the spectrogram has spectral periodicity is that it does not have spectral periodicity the step of testing for whether the signal is pulsed/power varying is not performed. There may thus be a decision of whether or not to test for whether the signal is pulsed/power varying on the basis of the result of the test of whether the spectrogram has spectral periodicity or not.

The step of testing for whether the signal is pulsed may include sampling the signal, dividing the samples into blocks, calculating the average power for each block and then analysing the resulting power values allocated to the respective blocks. For example some blocks may be deemed to be high power blocks (for example "RFI on" blocks). Some blocks may be deemed to be low power blocks (for example "RFI off" blocks). If the signal can be divided into a small number of groups of blocks, each group having a narrow range of power level associated with it, the signal may be deemed to be pulsed. If the signal has a significant number of groups of blocks deemed to represent low or zero power and "RFI off" and also a significant number of groups of blocks deemed to represent relative high power, the signal may be deemed to be pulsed. The blocks may be divided between two groups, one group representing an "RFI off" state the other group representing an "RFI on" state. Those blocks allocated to the "RFI off" state may be blocks that have an average power less than the mean power of all blocks (or the mean power of the signal over a measurement window). Those blocks allocated to the "RFI off" state may be blocks that have an average power less than a pre-set threshold. Blocks not allocated to the "RFI off" state may be allocated to the "RFI on" state. The mean power of the "RFI on" blocks may be compared to a pre-set threshold. The mean power of the "RFI off" blocks may be compared to a pre-set threshold. The mean power of the "RFI on" blocks may be compared to the mean power of the "RFI off" blocks. One or more such comparisons may be made in order to decide whether the signal is pulsed. One or more such comparisons may be made in order to decide whether the signal is power varying.

If the result of the decision on whether the spectrogram has spectral periodicity is that it does not have spectral periodicity, there may be a step of testing for whether the signal is time periodic. Such a test may include performing an autocorrelation function on the time-domain signal.

There may be a step of testing for frequency variation in the jamming signal. There may be a step, for example as part of the testing for frequency variation, of skewing the spectrogram of the jamming signal. The skewing may shift data by different amounts along the time axis, the amount of the shift depending on the frequency. There may then be a test of whether such a skewed spectrogram has better defined grouping of signal components, in the time domain, than a reference spectrogram or a threshold. The reference spectrogram or threshold may be based on an unskewed spectrogram. If the skewed spectrogram has a better defined (a significantly better defined) grouping of signal components, the jamming signal may then be deemed to have frequency variation. The method may be able to deem at such a stage that the jamming signal has periodic frequency variation. The skew may be a linear skew. For example, the skewing may shift data by an amount along the time axis, the amount being proportional to a parameter related to the frequency. As mentioned above, the spectrogram may be represented by a two-dimensional array, the array representing rows and columns (which being arbitrary of course) one of the rows and columns representing time and the other of the rows and columns representing frequency, with each intersection of a row and a column being a value of power of the signal at that time and at that frequency. It will also be appreciated that each value in such an array of values might represent the power (for example the average or sum power) of the signal over a given time period (centred at a given time) across a particular frequency band (centred at a given frequency). If the spectrogram is represented by having time along a horizontal axis (or row) and frequency along a vertical axis (or column) and power, or some other parameter that represents the contribution to the jamming signal at a particular time and at a particular frequency, being represented by a value (or a point along an orthogonal axis), the skew may be considered as a horizontal skew of the spectrogram. Such a method may be referred to as a horizontal adjustment test. The shifting of data may be circular, for example such that in a row of N values, the values of power in the first, second and $n_{th}$ cells, $C_1, C_2 \ldots C_{N-1}$ and $C_N$ being $P_1, P_2 \ldots P_{N-1}$ and $P_N$ a shift of X cells (with $1<X<N-1$) horizontally, results in the values $P_1, P_2 \ldots P_{N-1}$ and $P_N$ previous in cells $C_1, C_2 \ldots C_{N-1}$ and $C_N$ being shifted to $C_{1+x}, C_{2+x} \ldots C_{x-1}$ and $C_x$. If x is calculated as being a fractional value, the shift may be carried out by rounding x, or by interpolation. The method may include multiple skews of the spectrogram. The method may include performing a number of skews being equal to or greater than half of the number of discrete samples taken over time represented by the spectrogram. The method may include performing a number of skews being substantially equal to the number of discrete samples taken over time represented by the spectrogram. When multiple skewed spectrograms are calculated, the skewed spectrogram with the best grouping of power values may be selected. If that best grouped skewed spectrogram has grouping of signal components that is better by an amount greater than a threshold, the jamming signal may then be deemed to have frequency variation. There may be a step of calculating how much better grouped the signal components are as between a skewed and unskewed spectrogram. Such a step may be achieved by summing the values in each line representing a given time (e.g. a column) and assessing whether there are a greater number of high sums. For example, a single parameter may be calculated by summing each column (each representing an instant in time) raising the values to a power being greater than 1 (preferably 2 or more) and then summing those numbers. Such a single parameter will be significantly higher when the signal powers are aligned and is a convenient means of comparing the grouping of powers as between spectrograms skewed by different amounts. If such a single parameter is greater than a pre-set threshold, the jamming signal may then be deemed to have frequency variation. The pre-set threshold may be set in dependence on the single parameter as calculated for the unskewed spectrogram. For example, the threshold may be equal to the single parameter as calculated for the unskewed spectrogram multiplied by a factor, the factor being a constant number (for example greater than 2).

There may be a step of testing to distinguish between one or more types of jamming signal from one or more different types by means of shifting different strips of the spectrogram by different amounts along the time axis. Each such strip may concern at least one frequency band covering multiple different frequencies. Such a method may be referred to as a shifted sum test. The shifting of strips may be similar in certain respects to the skewing mentioned above. For example, when shifting a strip the shift may be circular. The shifting of strips may shift data by different amounts along the time axis. The shifting of strips in this part of the method may be with the aim of better aligning the power values, in the time domain of the spectrogram. Thus, the amount of the shift may be calculated with the aim of better grouping the power values along the time axis. There may be a test of whether a strip-shifted spectrogram has better defined grouping of signal components, in the time domain, than a reference spectrogram or a threshold. The reference spectrogram or threshold may be based on an unshifted spectrogram. The decision tree may be so structured that if the shifted spectrogram has a better defined (a significantly better defined) grouping of signal components, the jamming signal may then be deemed to be a frequency hopping signal. The method may include creating only one complete strip shifted spectrogram, in which the spectrogram is divided into a plurality of strips and an attempt is made to line up the power values in all such strips to line up as best as possible in the time domain. The method may include a step of determining the boundaries of the strips in dependence on the power distribution in the spectrogram. There may be a step of calculating how much better grouped the signal components are as between a shifted and unshifted spectrogram, in substantially the same manner as described above in relation to the comparison of the skewed and unskewed spectrograms. The shifting may be such that a part of the spectrogram concerning at least one frequency band covering multiple different frequencies is shifted along the time axis by the same amount whereas other parts of the spectrogram concerning other frequencies are shifted along the time axis by different amounts.

Preferably, once it has been determined that the jamming signal is spectrally periodic and frequency varying a test is made to distinguish between a frequency hopping signal and a continuously frequency varying (e.g. swept) signal. This can be achieved by comparing the results of the aforementioned shifted sum test with the results of the aforementioned horizontal sum test.

It may be that if the result of the decision on whether the spectrogram has spectral periodicity is that it does not have spectral periodicity a step of testing for time periodicity is performed. It may be that if the result of the decision on whether the spectrogram has spectral periodicity is that it does have spectral periodicity the step of testing for time periodicity is not performed. Thus, there may be a decision of whether or not to perform the testing for time periodicity on the basis of the result of the test of whether the spectrogram has spectral periodicity or not.

It is preferred that the method of performed to distinguish between 5 and 20 different types (and preferably no more than 20 different types) at least 5 of which (preferably at least 10 of which) being in the group consisting of: non-pulsed wide band noise, non-pulsed narrow band noise, non-pulsed single tone, non-pulsed multi-tone, non-pulsed CDMA (code division multiple access) signal, pulsed wide band noise, pulsed narrow band noise, pulsed single tone, pulsed multi-tone, pulsed CDMA, non-pulsed sawtooth chirp, non-pulsed triangular chirp, non-pulsed chirp (not being sawtooth chirp or triangular chirp), pulsed sawtooth chirp, pulsed triangular chirp, pulsed chirp (not being sawtooth chirp or triangular chirp), continuous frequency hopped, pulsed frequency hopped.

Above there are described various features concerning methods of classifying a GNSS jamming signal. Certain embodiments of the invention relate to detecting, without necessarily also classifying, a GNSS jamming signal. Such a method may be performed in relation to a signal detected at a detector. The method includes calculating a plurality of confidence values representing the confidence of detection of a jamming signal. At least one of the confidence values may be based on a test which includes analysing the absolute power of the signal received at the detector. This may include comparing, against a threshold power level, an indication of the absolute power of the signal received at the detector, preferably across substantially the entire bandwidth of the detector, over a given time window.

At least one of the confidence values may be based on a test which includes analysing an indication of the rate of change of the power of the signal received at the detector. For example the rate of change may be compared with a threshold rate of change of power. The rate of change of power that is used in such analysis is preferably the rate of change of the power as measured across the entire bandwidth of the detector, over a given time window.

The absolute power may be derived by sampling the gain applied by an automatic gain control that is arranged to control the gain applied by a signal amplifier (for example a variable gain amplifier) that forms part of the detector. The absolute power may alternatively, or additionally, be calculated by means of a converting a directly received analogue signal into a quantised digital signal in which the power at a given instant is represented by means of a digital value. A digital power quantity may be calculated from a stream of digital values received over a measurement window.

At least one of the confidence values may be based on a test which includes analysing the measured power of the signal received at the detector at two or more given frequencies, preferably at ten or more, and possibly at a hundred or more such frequencies. Spectral analysis is preferably performed. The analysis may include comparing (i) the measured power of the signal received at the detector, over a given frequency band which has a narrow bandwidth and is centred on a given frequency, over a given time window with (ii) a threshold power level associated with that given frequency band.

At least one of the confidence values may be based on a test which includes analysing the rate of change of measured power of the signal received at the detector at two or more given frequencies, and preferably at ten or more, and possibly at a hundred or more such frequencies. Such a test may include comparing (i) the rate of change of the measured power of the signal received at the detector, over a given frequency band which has a narrow bandwidth and is centred on a given frequency, over a given time window with (ii) a threshold rate of change of power associated with that given frequency band. Spectral analysis may be performed on the rate of change of power of various frequency components of the detected signal. The test may include comparing (i) the rate of change of the measured power of the signal received at the detector, over each of a plurality of given frequency bands, each having a narrow bandwidth and being centred on a given frequency, over a given time window with (ii) a threshold rate of change of power associated with each given frequency band.

At least one of the confidence values may be based on a test which includes analysing an output of a GNSS receiver forming at least part of the detector. The output may represent the quality of geolocation data/signal received or produced by the GNSS receiver. There may for example be a step of comparing the output of a GNSS receiver with a threshold. There may be a test of comparing the rate of change of such an output of such a GNSS receiver with a threshold rate of change. The output concerning the quality of geolocation data may be in the form of a measure of the accuracy or precision of the GNSS data. For example, if the location of the GNSS receiver is already known to a high degree of accuracy, the accuracy and precision of the calculated geolocation of the GNSS receiver from the GNSS data received at a given time may be an indicator of the quality of the geolocation data/signal. The output concerning the quality of geolocation data may be in the form of a calculated ratio concerning the amount of noise detected in the GNSS signal received by the receiver. The output concerning the quality of geolocation data may be in the form of a calculated signal to noise ratio. The output concerning the quality of geolocation data may be in the form of a calculated carrier to noise ratio. The output may be one that is readily provided by a commercial off the shelf (COTS) GNSS receiver. The threshold may be set on the basis of reference data. The reference data may include data from which the expected value of a parameter representing quality (e.g. signal to noise ratio) can be predicted on the basis of the identity and position of the one or more GNSS satellites from which GNSS signals are received at the detector. Different satellites can produce GNSS signals of different quality. The elevation of a given satellite can affect the quality of the GNSS signal. The threshold may thus be calculated in dependence on at least one of the identity and position of the one or more GNSS satellites from which GNSS signals are received at the detector.

The reference data may be collected over a time during which it can be deemed with certainty that no jamming signal is present. The reference data may be collected over a period of at least 5 hours. It is preferred that the reference data is collected over a period of at least 24 hours. The reference data may be in the form of a measure of expected noise in view of certain conditions. The reference data is preferably collected in a manner that enables future distinction between particular GNSS satellites.

It may be that at least four of tests (i) to (vi) are performed. It may be that at least five of tests (i) to (vi) are performed. It is preferred that all of tests (i) to (vi) are performed.

A global decision is taken on whether or not to deem detection of a jamming signal on the basis of a combination of the confidence values calculated as a result of performing those of the aforementioned tests as are performed. The making of the global decision may include (a) analysing a combination of the confidence values resulting from tests (i) and (ii). Thus the absolute value of overall signal power and the rate of change of overall signal power may be combined to assist in the global decision. The making of the global decision may include (b) analysing a combination of the confidence values resulting from tests (iii) and (iv). Thus the absolute values of signal power at particular frequencies and the rate of change of such values of signal power may be combined to assist in the global decision. The making of the global decision may include (c) analysing a combination of the confidence values resulting from tests (v) and (vi). Thus the absolute values of quality of geolocation data/signal received or produced by the GNSS receiver and the rate of change of such values may be combined to assist in the global decision. The making of the global decision may include (d) analysing a combination of the confidence values resulting from two of, and preferably all three of, tests (i), (iii) and (v). Thus, various absolute values of different measures may be combined to assist in the global decision. The making of the global decision may include (e) analysing a combination of the confidence values resulting from two of, and preferably all three of, tests (ii), (iv) and (vi). Thus, various rate of change values of different measures may be combined to assist in the global decision. The global decision may be made on the basis of a combination of at least three of calculations (a) to (e) mentioned above. Preferably the global decision may be made on the basis of a combination of at least four of calculations (a) to (e) mentioned above. It may be that the global decision is made on the basis of a combination of all five of calculations (a) to (e). Advantageously, it has been found that a relatively high accuracy of detection of a jamming signal (and a correspondingly high accuracy of deemed non-presence of a jamming signal—i.e. low incidence of false alarms) can be provided by means of using all five of such calculations in combination in a global decision.

Some of the signals/data analysed that is captured and then analysed may be sampled before GNSS signal correlation is performed ("pre-correlation" signals/data). Some of the signals/data analysed that is captured and then analysed may be taken from the signal after GNSS correlation has been performed ("post-correlation" signals/data). It will be understood that such pre-correlation and post-correlation are terms of the art in the field of GNSS receivers. Correlation is generally an essential aspect of the operation of a typical GNSS receiver in retrieving the geolocation data encoded in the GNSS signals received.

The global decision on whether or not to deem detection of a jamming signal may be expressed as a binary decision (e.g. either "jamming signal detected" or "jamming signal not detected: an "on" or "off" decision). The global decision on whether or not to deem detection of a jamming signal may be expressed as a confidence value. For example, the confidence value may range from 0 to 1 where 1 represents complete or very high confidence of there being a jamming signal and 0 represents complete or very high confidence of there not being a jamming signal, with values in between representing the amount of certainty of there being/not being a jamming signal.

At least one of tests (i) to (vi) may be able to yield a result indicating complete confidence that there is a jamming signal. It may be that each the tests (i) to (vi), as are performed, is capable of yielding a result indicating complete confidence that there is a jamming signal. It may be that calculations (a) to (e), as may be performed, are such that the global decision on whether or not there is a jamming signal will always deem a jamming signal to be present in the event that any one of tests (i) to (vi), as may be performed, indicates with complete confidence that there is a jamming signal. It may be that one or more of tests (i) to (vi) are able to yield a result indicating partial confidence that there is a jamming signal. The method may be so performed that a combination of two or more confidence values indicating only partial confidence that there is a jamming signal is sufficient to deem that there is indeed a jamming signal. It may be that if only one of tests (i) to (vi) yields a result indicating partial confidence that there is a jamming signal, and none of tests (i) to (vi) yields a result indicating complete confidence that there is a jamming signal, a jamming signal is not deemed to have been detected.

Certain embodiments of the invention have in common that they concern a method of geo-locating a GNSS jamming signal. Such methods may thus comprise not only detecting, but also locating the likely position of the GNSS jamming signal. There may be at least one fixed position signal detector arranged to detect the presence of a GNSS jamming signal. Such a fixed position signal detector may be considered as a primary probe. It may be that on detection of the presence of a jamming signal as detected by the fixed position signal detector, a mobile signal detector is dispatched, preferably to assist in the geolocation of the source of the GNSS jamming signal. Such a mobile signal detector may be considered as a secondary probe. There may be a step of using the mobile signal detector at a plurality of different locations to make measurements of one or more characteristics of the jamming signal, such as signal power. The power of jamming signal as detected is preferably used to geolocate the source. The mobile signal detector may provide feedback to a manual operator enabling the operator to determine the location of the source of the jamming signal. The type of jamming signal detected by the fixed position signal detector may be ascertained. The mobile signal detector may perform its own classification of the jamming signal type to confirm detection of the same source of the jamming signal. The type of jamming signal may be communicated from the fixed position signal detector to the mobile signal detector. The type of jamming signal may be communicated from the fixed position signal detector to the user of the mobile signal detector. The type of jamming signal may be ascertained by a method performed remotely from the fixed position detector. The type of jamming signal may be ascertained by a method performed by the fixed position detector. The power of the jamming signal may be extracted from the detected signal once the type of jamming signal has been characterised.

The mobile signal detector may perform its own classification of the jamming signal type at one of the plurality of different locations, for example at the start of the process and/or the end of locating of the position of the source of the jamming signal. It may be that the mobile signal detector does not perform the classification of the jamming signal type at at least some of the successive locations at which measurements are made. For example, it may be that the mobile signal detector performs its own classification of the jamming signal type at one of the plurality of different locations when making both the first and last measurements made when locating the position of the source of the jamming signal, but does not perform the classification of the jamming signal type in respect of substantially all of the intervening measurements.

It may be that the mobile signal detector directs the operator to move to a new location at which new measurements are to be made. The location may be selected by the mobile signal detector on the basis of the prior measurements made by the mobile signal detector. Such direction and guidance can assist the user of the mobile signal detector to quickly and efficiently determine the location of the source of the GNSS signal jammer. There may be a network of fixed position signal detectors arranged to detect the presence of a GNSS jamming signal. There may be a step of providing an indication of an approximate location of the jamming signal as determined by the network of fixed position signal detectors.

It may be that the jamming signal is detected by only one of fixed position signal detectors in the network, which may be indicative that the jamming signal is nearer that fixed position signal detector than any other. Additionally or alternatively, it may be indicative that the jamming signal is directional and emitting in a direction more towards that fixed position signal detector than any other. It may be that the jamming signal is detected by two or more of the fixed position signal detectors in the network, which may be indicative that the jamming signal is nearer those fixed position signal detectors than others in the network. Additionally or alternatively, it may be indicative that the jamming signal is directional and emitting in a direction more towards those fixed position signal detectors than others in the network.

As mentioned above, certain embodiments of the invention use power-based measurements in order to detect and/or classify a GNSS jamming signal at a detector. In certain embodiments an advantageous power analysis method is performed. An analogue signal representative of the power of a radio frequency signal is received and converted into a quantised digital signal in which the power at a given instant is represented by means of a digital value. There may then be a step of calculating a digital power quantity from a stream of digital values received over a measurement window. For that measurement window a threshold value may be set. The setting of the threshold value may take into account a quantisation model. The setting of the threshold value may take into account a sample variance for the number of measurements made in that particular measurement window. The setting of the threshold value may take into account environmental variance in respect of the particular measurement window. The threshold may thus be dynamically updated according to changing conditions, which may reduce false alarms. There may be a step of calculating a jamming signal detection parameter based on the digital power quantity and the threshold value so calculated. The jamming signal detection parameter may be in the form of a confidence value. The jamming signal detection parameter may be in the form of a binary decision (i.e. jamming signal present or jamming signal not present). The digital power quantity may be representative of the absolute power of the analogue signal detected. In such a case the threshold value may be representative of an absolute power above which a jamming signal can be deemed present. The digital power quantity may be representative of the rate of change of the absolute power of the analogue signal detected. In such a case the threshold value may be representative of the rate of change, or the increase over a short period of time, above which a jamming signal can be deemed present. It may be that both such absolute and differential comparisons of power are used in deeming the likelihood of whether a jamming signal is present. The digital quantisation may be as low as a 2-bit quantisation. The digital quantisation may be a 3-bit quantisation. Despite a relatively low resolution of digitisation, the large number of samples and an appropriate quantisation model can allow for accurate determination of the presence/absence of a jamming signal. Whilst 2-bit and 3-bit quantisation are mentioned above, it will be appreciated that embodiments of the invention may utilise digital quantisation of any number of bit quantisation except 1.

The threshold may be calculated in dependence on a reference power level. The reference power level may be derived from measurements made over multiple different time windows during which it is guaranteed there is no jamming signal present. The variance of the power level as determined by such measurements may be calculated and also used in setting the threshold. One or more of the following variables may be taken into account when setting the threshold: the ambient temperature, the radio frequency environment of the probe, the level of ionospheric activity, and the noise temperature of the receiver antenna and front end. The "front end" will be understood as the GNSS signal conditioning front end, that is the parts of the detector which receive the RF signals from the GNSS antenna, amplifies, filters, down-converts, and digitizes the intermediate/baseband frequency signals.

Certain embodiments of the invention have in common that they concern a method of analysing (whether at the detector or at a location remote therefrom), for example classifying, a GNSS jamming signal in which one of a finite number of types of jamming signal is selected as classifying the GNSS jamming signal, and in which the method comprises a step of analysing a spectrogram of the jamming signal, in order to distinguish between one or more types of jamming signal from one or more different types, by shifting different parts of the spectrogram by different amounts along the time axis, for example in an attempt to group signal components in the time domain. The step of shifting different parts of the spectrogram by different amounts along the time axis may comprise skewing the spectrogram of the jamming signal so as to shift data by different amounts along the time axis according to the frequency. Such embodiments may have one or more of the features of the horizontal adjustment test as described herein.

The step of shifting different parts of the spectrogram by different amounts along the time axis may, in some embodiments, comprise shifting different strips of the spectrogram by different amounts along the time axis. Each such strip may for example concern at least one frequency band covering multiple different frequencies. Such embodiments may have one or more of the features of the shifted sum test as described herein.

It will be appreciated that many of the steps mentioned above will be performed electronically, for example using computational and/or digital signal processing techniques. Such calculations, signal converting, tests, analysing steps and other signal processing steps as mentioned herein may be performed by a computer processor, for example one that is provided locally to the detector which detects the signals that are subsequently processed. For example there may be a fixed position signal detector having such a locally provided computer processor. There may be mobile, for example portable, signal detector having such a locally provided computer processor. Alternatively, or additionally, data may be saved for subsequent processing by a non-local processor. Alternatively, or additionally, data may be communicated to a remote location for computer processing. The processing at such a remote location may be performed by a more powerful computer than is able to be readily provided locally/in the field. The data processing at such a remote location may be provided by a back office function, for example by means of a computer server.

For example, the signal processing may be in the form of the detecting of the presence of a GNSS jamming signal. The signal processing may be in the form of the classification of a GNSS jamming signal that has been detected. The signal processing may be in the form of the selecting of a location by the mobile signal detector on the basis of the prior measurements made by the mobile signal detector.

Certain embodiments of the invention concern a GNSS jamming signal detector. Such a detector will typically comprise a GNSS signal antenna, a GNSS receiver and a suitably programmed computer processor. There may be a memory for buffering data. There may be a storage device, possible a removable device, for storing data for subsequent more detailed analysis. The detector may be a fixed position detector. The detector may be a mobile detector, for example a portable detector forming an apparatus being of a size and weight readily able to be carried by a single person. The detector may include a wireless communication module facilitating communication with at least one of a computer server and a further like detector. The computer server may be provided as part of a back office support facility. There may be a network of detectors. Each detector may be arranged to communicate with at least one of a computer server and another detector in the network. There may be provided a server arranged (e.g. programmed with suitable software) to control and communicate with such a network of detectors. The server may be one of many such servers. There may be computer servers that function as hubs for example, communicating data between a part of the network (for example comprising one or more detectors) and a control centre. There may be a central server, for example serving the function of a control centre. The network of detectors may be arranged in a star network.

Embodiments of the invention concern a computer software product that when executed on a computer performs the function of the one of the aforementioned servers. Embodiments of the invention concern a computer software product that when executed on a processor of a detector causes the detector to have the required function as described herein.

There will now be described certain embodiments of the invention with reference to the accompanying drawings.

A system for detecting a GNSS jamming signal in accordance with an embodiment of the invention is shown in FIG. 1. The system comprises a central server 100, a set of fixed position signal detectors (primary probes) 102, a set of local hubs 104 and a set of mobile signal detectors (secondary probes) 106. By way of a general overview, the primary probes 102 are used to detect and perform local characterisation of GNSS jamming signals, the mobile secondary probes 106 are primarily used when wishing to better identify the location of the source of the jamming signal, and the hubs and server are used to form a communications network and to provide a more powerful computing resource for the likes of signal processing, data storage and reporting purposes.

The primary probes 102 are configured to communicate with both the central server 100 and the local hubs 104. The local hubs 104 are configured to communicate with both the primary probes 102 and the central server 100. The secondary probes 106 are configured to communicate with the central server 100.

In use, the central server 100 collects data and messages from the probes 102/local hubs 104, performs central data processing and analysis, and archives corresponding event information in a database. It is also configured to monitor and control all the probes 102 and local hubs 104 remotely. The central server 100 also comprises a $3^{rd}$ party interface which enables it to obtain information from sources other than the probes. The central server is able to change threshold values for triggering event reports by the probes based on its own computation results and/or the database of the previous events. The central server 100 is able to change threshold values for triggering event reports by the probes based on $3^{rd}$ party information. In one variation of the embodiment the threshold values are changed in response to natural phenomena which disrupt GNSS services.

The local hubs 104 are a local gateway between the probes 102 within close proximity and the central server 100. The local hubs 104 are also data archives to store event reports and alert messages from the probes 102 locally. Each local hub is also configured to perform a portion of the processing of the data received from the probes 102 within close proximity before forwarding the local event report to the central server 100. In the present embodiment the local hubs 104 are general-purpose wirelessly networked computers configured, by being appropriately programmed with software, to perform the functions required by the present embodiment.

The primary probes 102 comprise sensors configured to automatically identify the appearance of specific local RFI events, generate event reports based on each local RFI event, and send the reports to the central server 100 (either directly or via local hubs 104) for network level processing.

The secondary probes 106 are devices designated to be used by an operator within a proximity of the RFI source to identify and locate the RFI source, once a primary probe 102 has reported an RFI event. While in the present embodiment the secondary probes are dedicated devices with all the required hardware and software integrated, a software application together with an add-on hardware dongle can be used in other embodiments that can be hosted by general portable computers such as tablet PCs.

Figure 2:
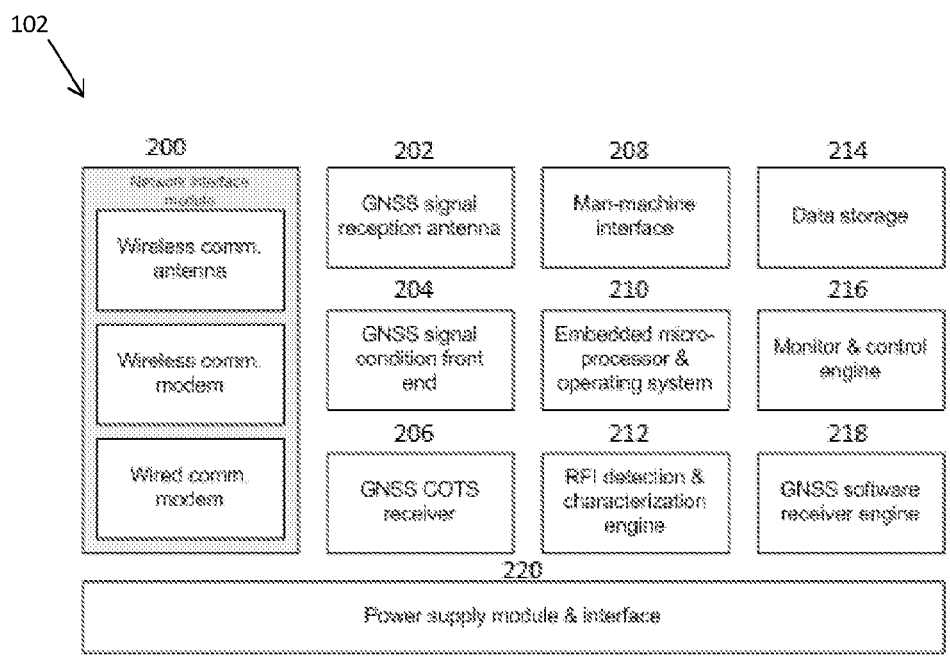
FIG. 2 shows block diagram of a primary probe.

FIG. 2 illustrates an embodiment of the primary probe 102, comprising a network interface module 200, a GNSS signal reception antenna 202, a GNSS signal condition front end 204, a GNSS COTS receiver 206, a man-machine interface 208, an embedded microprocessor and operating system 210, an RFI detection and classification engine 212, a data storage unit 214, a monitor and control engine 216, a GNSS software receiver engine 218 and a power supply module and interface 220.

The network interface module 200 is responsible for handling data communications made to other devices such as the local hubs 104 and the central server 100. While in this embodiment the network interface module 200 comprises a wireless communication antenna, alternative embodiments comprise wired communication modems such as an Ethernet modem, or other wireless communication modules such as cellular network modems (e.g. GSM, GPRS, UMTS, or LTE). Other embodiments comprise a combination of different modules, both wired and wireless.

The GNSS signal reception antenna (or GNSS antenna) 202 receives GNSS signals and is therefore an interface to the GNSS signal-in-space (SIS). The antenna is capable of receiving the GNSS signal frequency bands that the probe is monitoring. In the present embodiment, the antenna is a GPS L1 single frequency antenna. In an alternative embodiment the antenna can receive dual GPS L1 and L5 bands. In an alternative embodiment the antenna can receive any combination of the 2 or more GNSS frequency bands. The GNSS antenna 202 is communicatively connected to the digital signal condition front end 204 and the GNSS COTS receiver 206 and transmits received RF signals to them. In other embodiments the GNSS antenna 202 amplifies the received RF signals with a low noise amplifier (LNA) before the signal is transmitted to the signal condition front end 204.

The GNSS signal condition front end (or GNSS front end) 204 is an electronic device that receives RF signals from the GNSS antenna. The GNSS front end 204 is able to amplify, filter, down-convert and digitize the intermediate/baseband frequency signals. Digitized signals are transmitted to the micro-processor 210 in soft real time for further processing.

The embedded micro-processor and operating system 210 host the relevant processing such as GNSS software receiver engine 218, RFI detection and characterization engine 212, and probe monitor and control engine 216. The monitor and control engine 216 is a software engine that enables remotely monitoring and controlling of the probe. This includes probe status monitoring, and configuration of system updates. The RFI detection and characterization engine 212 is the core software engine that performs RFI detection, and characterization using algorithms, as explained in further detail later, based on the digital samples from the GNSS signal conditioning front end 204. The GNSS software receiver engine 218 is a software engine that performs the GNSS signal acquisition, signal tracking, navigation message processing, and position solution computation. The GNSS software receiver engine 218 is a software engine that is able to generate the measurements and values of certain parameters that are used for the RFI detection.

The GNSS COTS receiver 206 is a 3rd party GNSS receiver that processes GNSS signals received from the GNSS antenna 202 to generate information based on the received signals. It provides standard GNSS receiver output in standard formats, such as NMEA. The information generated includes position, time and velocity of the probe, as well as satellite measurements such as the elevation, azimuth and signal-to-noise ratio. In alternative embodiments the GNSS COTS receiver 206 is not present at all.

The man-machine interface 208 is an interface to physically connect to the probe for local diagnostics, testing, and control. Although a primary graphical user interface (GUI) is implemented remotely at the local hubs 104 or the central server 100, an alternative display can also be attached via an interface of the probe. In this embodiment the interface is an HDMI interface.

The data storage unit 214 comprises a memory device configured to store event reports generated by detected signals as well as the snapshot of the digital samples that are used as digital fingerprint of the interference signals. In the present embodiment the memory device used is a micro SD card.

Figure 3:
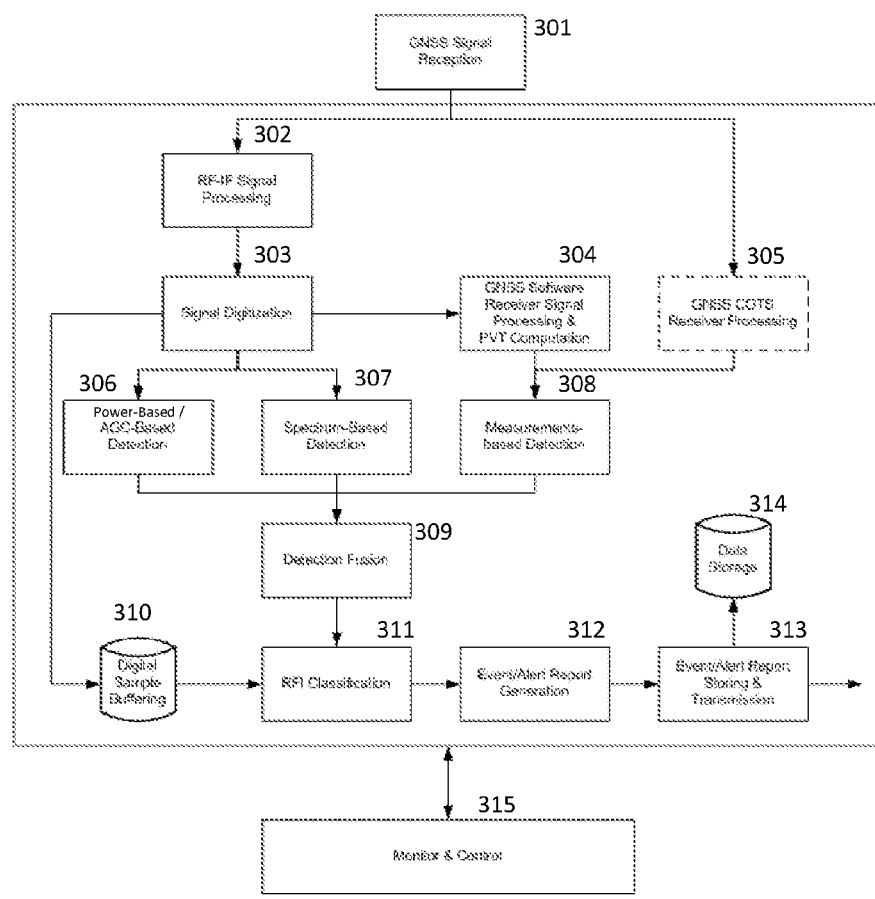
FIG. 3 shows a flowchart for the operation of the primary probe.

The operation of a primary probe 102 when detecting a GNSS signal is shown in FIG. 3. Firstly, for each period of probing, the monitored GNSS frequency band signals are received by the GNSS antenna 202 (step 301) which amplifies the received RF signals with a low noise amplifier (LNA). The analog RF signal stream from the GNSS antenna 202 is then split into two, one transmitting the signal to the GNSS front end 204, and the other transmitting the signal to the COTS GNSS receiver 206.

At the GNSS front end 204, the received analog RF signals are further processed (step 302) both in the analog domain and digital domain. In the analog domain, the signal is amplified, filtered, and down-converted to the intermediate frequency or baseband. The resulting signal is then digitized (step 303) (sampled and quantized, e.g. by the ADC). The digitized signal is transmitted to the processor 210 for buffering (step 310), transmitted to the software receiver engine 218 for baseband processing and computing the navigation solution (step 304), and fed to a power-based RFI detection algorithms (i.e. which in some variations may be in the form of a detection algorithm based on one or more parameters derived from automatic gain control circuitry) as well as spectrum-based detection algorithms (steps 306 and 307 respectively). The COTS receiver also processes the received signals from the GNSS antenna 202 (step 305). The computed navigation solution and the COTS receiver measurements/solutions are fed into measurement-based detection algorithms (step 308).

There are therefore three separate detection algorithms that are employed in parallel, namely the power-based detection 306, the spectrum-based detection 307, and the measurement based detection 308. Each algorithm provides two separate results concerning the likelihood of the signal detected being or comprising a jamming signal, as will be described in further detail later. The data from the detection results from the three detection algorithms (six detection results in total) are then gathered and fed to a detection fusion algorithm engine to make a final detection decision, deciding whether RFI is present (step 309). If it is decided that RFI is present, the buffered digital samples together with the computation results from the three detection engines will be fed to an RFI classification engine to characterize the type of the interference (e.g. the type of jamming signal) and a corresponding numerical confidence level of the classification (step 311). Based on both the detection and the classification results, an event record for this specific epoch will be generated (step 312). If before this epoch, the RFI has already been deemed present, the record for the current epoch will be added to the event report file (step 313). Otherwise if this is the first epoch that the RFI is deemed present, a new event report file will be generated with the record for the current epoch appended. If the classification deems, based on data stored within the database, the RFI interference to be a malicious and dangerous jamming signal an alert message is generated. The event report and the corresponding snapshot of the digital signal samples will be stored on the data storage device and meantime scheduled to be transmitted to the central server 100 (step 314). If an alert is raised, the alert message will be transmitted to the central server 100 immediately. The operation of the primary probe 102 during this process is monitored by a monitor & control unit 315. In the present embodiment this unit is located in the central server 100, but in variations of the embodiment it may be located elsewhere.

The frequency range which can be monitored is determined by the available processing capacity, and by the capabilities of the GNSS antenna 200 and front end 204. A single RF chain centred at the GPS L1 central frequency of 1575 MHz and with a bandwidth of +/−8 MHz is sufficient to capture all interference likely to impact a GPS L1 receiver. This embodiment uses a STEREO front end which includes 2 channels. The first channel is directed to L1 as described, the second channel has 80 MHz bandwidth. The second channel can be centred on any L-band frequency so can be used to monitor GNSS on the bands L1/E1, L2, L5/E5a/E5b, E6 as well as part of GSM bands.

Figure 4:
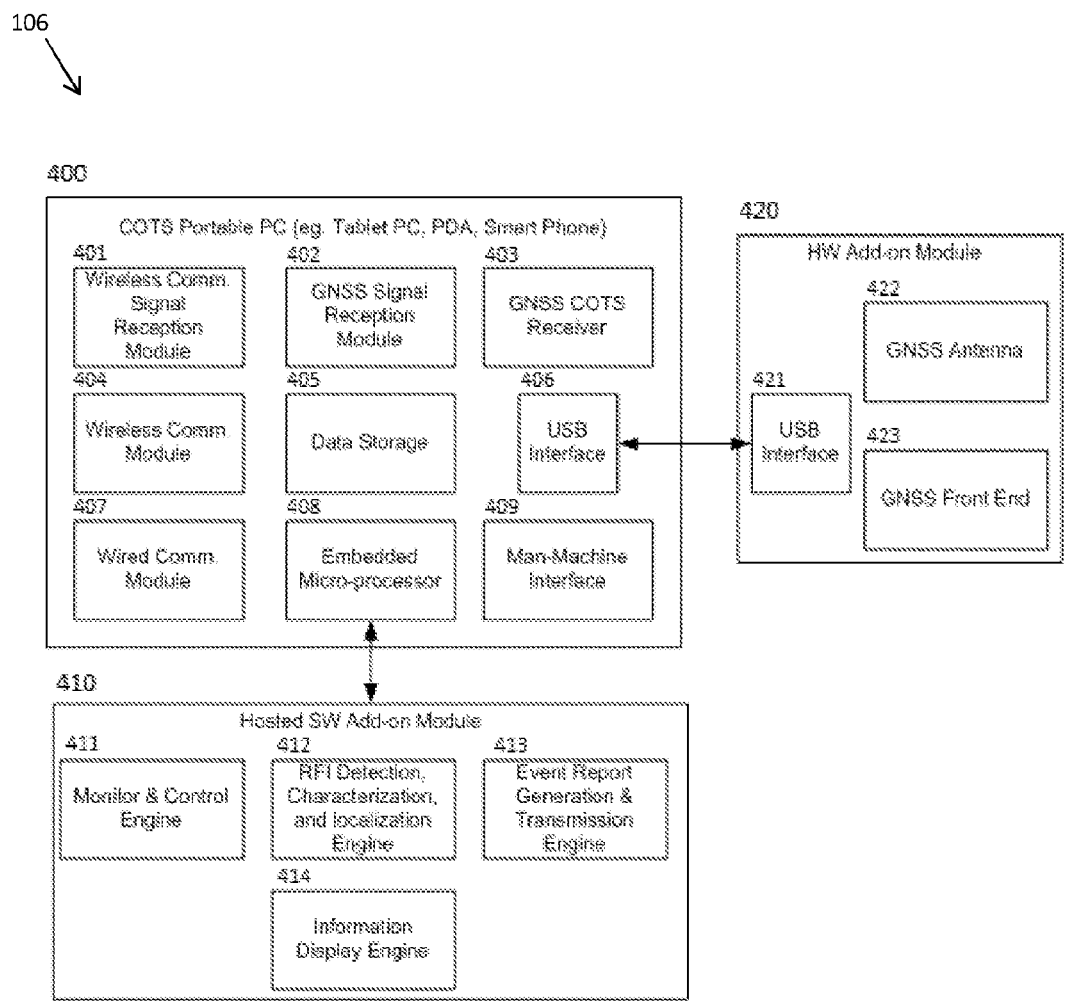
FIG. 4 shows a block diagram of a secondary probe.

An embodiment of the secondary probe 106 is shown in FIG. 4. The objective of the secondary probe 106 is to detect and locate the RFI source within a small geographic range. In the present embodiment, the secondary probe 106 comprises a COTS Portable Personal Computer Device (or portable PC) 400, a software (SW) add-on module 410 hosted by the portable PC 400 and a hardware (HW) add-on module 420. In this embodiment the portable PC 400 is a tablet PC, while in other embodiments the device is a PDA or a smart phone.

The portable PC 400 comprises a wireless communication signal reception module 401, a wireless communication module 404, a wired communication module 207, a GNSS signal reception module 402, a GNSS COTS receiver 403, a data storage unit 405, a USB interface 406, an embedded microprocessor 408 and a man-machine interface 409.

The HW add-on module 420 comprises a USB interface 421, a GNSS antenna 422 and a GNSS front end 423. The HW add-on module connects to the portable PC via the USB interfaces 406, 421, and the portable PC 400 is able to configure the module via this connection. In other embodiments the HW add-on module connects to the portable PC via other wired communication such as Ethernet or via wireless communication means such as Bluetooth or cellular network modems. The present embodiment uses the Maxim-Integrated single chip ASIC GNSS L1 frequency front end chip for signal radio frequency (RF), intermediate frequency (IF), and digitisation processing to output the IF or baseband (BB) digital time series of the analysed signal. In other embodiments the GNSS front end used in the secondary probe 106 is the same as that in the primary probe 102.

The software (SW) add-on module 410 comprises a monitor and control engine 411, an RFI detection, classification and localisation engine (or RFI engine) 412, an event report generation and transmission engine (or report engine) 413 and an information display engine 414. The SW add-on module 410 is hosted by the portable PC 400.

Figure 5A:
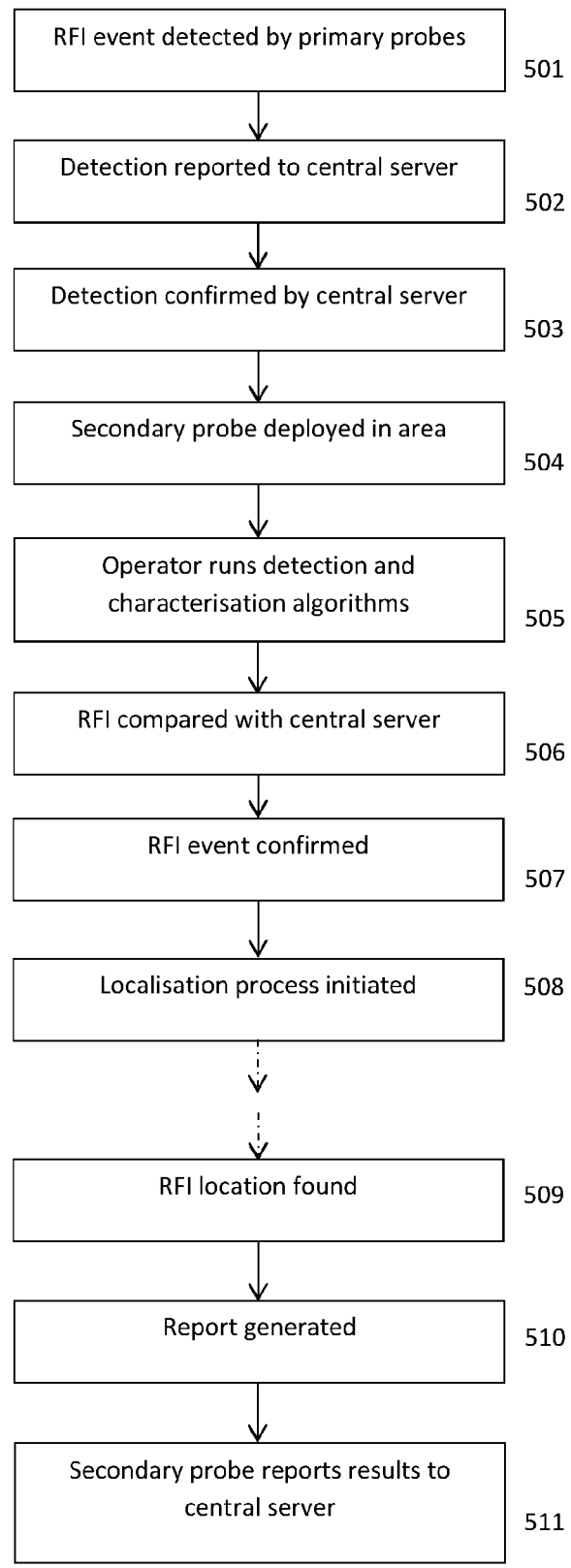
FIGS. 5a and 5b show flowcharts for the localisation of a jamming signal using a secondary probe.

FIG. 5a shows a block diagram illustrating the process of locating an RFI source using a secondary probe. In one embodiment, an RFI event is detected by a network of primary probes 102 in a certain area (step 501). This detection is reported to the central server 100 (step 502) and is confirmed by the server 100 (step 503). A secondary probe 106 is deployed in the area to locate the RFI source (step 504). Once the secondary probe 106 has arrived at the area, the operator of the secondary probe runs one detection and classification algorithm (step 505) and compares the detected RFI event radio frequency signature with the one that has been sent to it from the central server 100 (step 506). The RFI event is confirmed (step 507), and the operator starts a localisation process (step 508) (which process is described in further detail below with reference to FIG. 5b) until the RFI source is found (step 509). Once the RFI source has been found, the secondary probe generates the report which contains the evidence such as time and location stamped photos and finger-prints of the signal (step 510), and reports the results to the central server 100 (step 511).

Figure 5B:
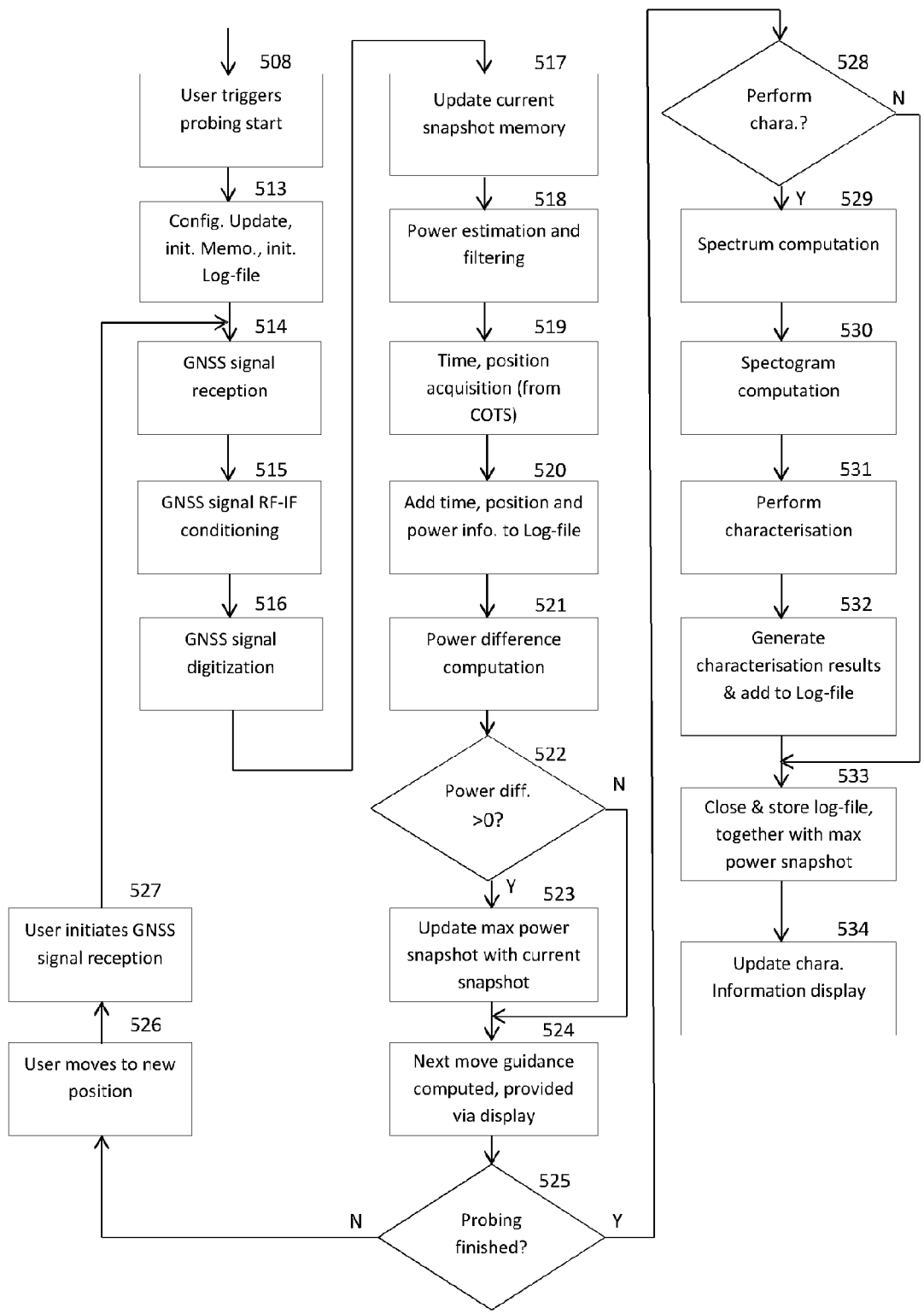

FIG. 5b shows a decision tree illustrating the localisation process performed by the secondary probe 106 when triggered by means of step 508 mentioned above. Thus, with reference to FIG. 5b, the user of the secondary probe 106 triggers the probing to start at a location (step 508). The secondary probe 106 then initiates (including the creation of a new log-file (step 513)), and the GNSS antenna/front end receives a GNSS signal (step 514), conditions and digitizes the signal (step 515 and step 516), and updates the memory device with the signal information (step 517). The signal is filtered and the power of the GNSS signal is estimated using the secondary probe's detection, classification and localisation engine 412 (step 518). The time and the position of the receiver are ascertained using the GNSS COTS receiver 403 (step 519). The time and position can also be measured by other sources such as other wireless channels. The time, position and power information is added to a log-file (step 520), and a power difference computation is performed by the embedded microprocessor 408 (step 521). The power difference computation compares the detected power level with previous power levels saved in the log-file (step 522). If the power difference is positive, then the maximum power snapshot is updated (step 523) (including the time and position of the maximum power measurement). If the power difference is not positive, the maximum power snapshot is not updated. Based on the measured power differences, the secondary probe 106 computes a guidance for the next measurement location (step 524). The computation in the present embodiment uses triangulation techniques assuming that the location of the source of the signal is stationary and that both the location of the secondary probe and the location of the source may be deemed to be on flat level ground, but more sophisticated geo-location methods may be implement in variations of the embodiment. The secondary probe 106 may thus estimate a likely location of the source of the detected signal and use that estimated location in order to determine a suitable location from which the next measurement should be taken. The user is then guided to the next location and then takes another power measurement (steps 526 and 527). This process is repeated until the user decides that the RFI source has been found, at which point the user indicates to the secondary probe 106 that the probing period has finished. The user then decides whether the secondary probe 106 performs a classification process using the detection, classification and localisation engine 412 (step 528). If selected, the secondary probe 106 performs a spectrum computation, a spectrogram computation and a classification algorithm (steps 529, 530 and 531 respectively). The results are then generated and added to the log-file (step 532). After the classification process, the log-file is closed and stored and the information display is updated with the classification results (step 533 and step 534). If the classification process is not selected, then the log-file is closed and stored.

As mentioned above in relation to FIG. 3, six detection results are generated by separate detection algorithms which are all used by a detection fusion algorithm engine to make a final detection decision. The way in which those six detection results are ascertained and then subsequently used will now be described with reference to FIGS. 6, 7, 8a and 8b. Two results are derived from power-based algorithms, two results are derived from spectrum-based algorithms and two results are derived from measurement-based algorithms based on data from the COTS receiver 206. For the power-based and spectrum-based algorithms, the probes 102, 106 take a number, $N_e$, of measurement samples during each detection epoch. These measurement samples are evaluated by the probe to determine if there is interference. $N_e$ is a number which is constrained by the maximum computational complexity of the probes. For the measurement-based algorithms, the probes receive data from the COTS receiver 206 for the given detection epoch and analyse it as outlined below.

Each pair of detection algorithms consists of a first algorithm based on absolute values and a second algorithm based on changes in values (differential values).

The two power based detection algorithms (absolute power algorithm and differential power algorithm) monitor the distribution of digital bits inside the receiver front end 204. They are designed to detect the appearance of RFI based on the overall power contained in the whole bandwidth of the receiving front end 204. If the distribution is too unusual, or there is a large and sudden change in distribution, then the likely cause is an added interference source. The easiest distribution metric to study is the power. The key reason to use the power metric is that it will work for most if not all types of interference, including a Gaussian power distribution.

Figure 6:
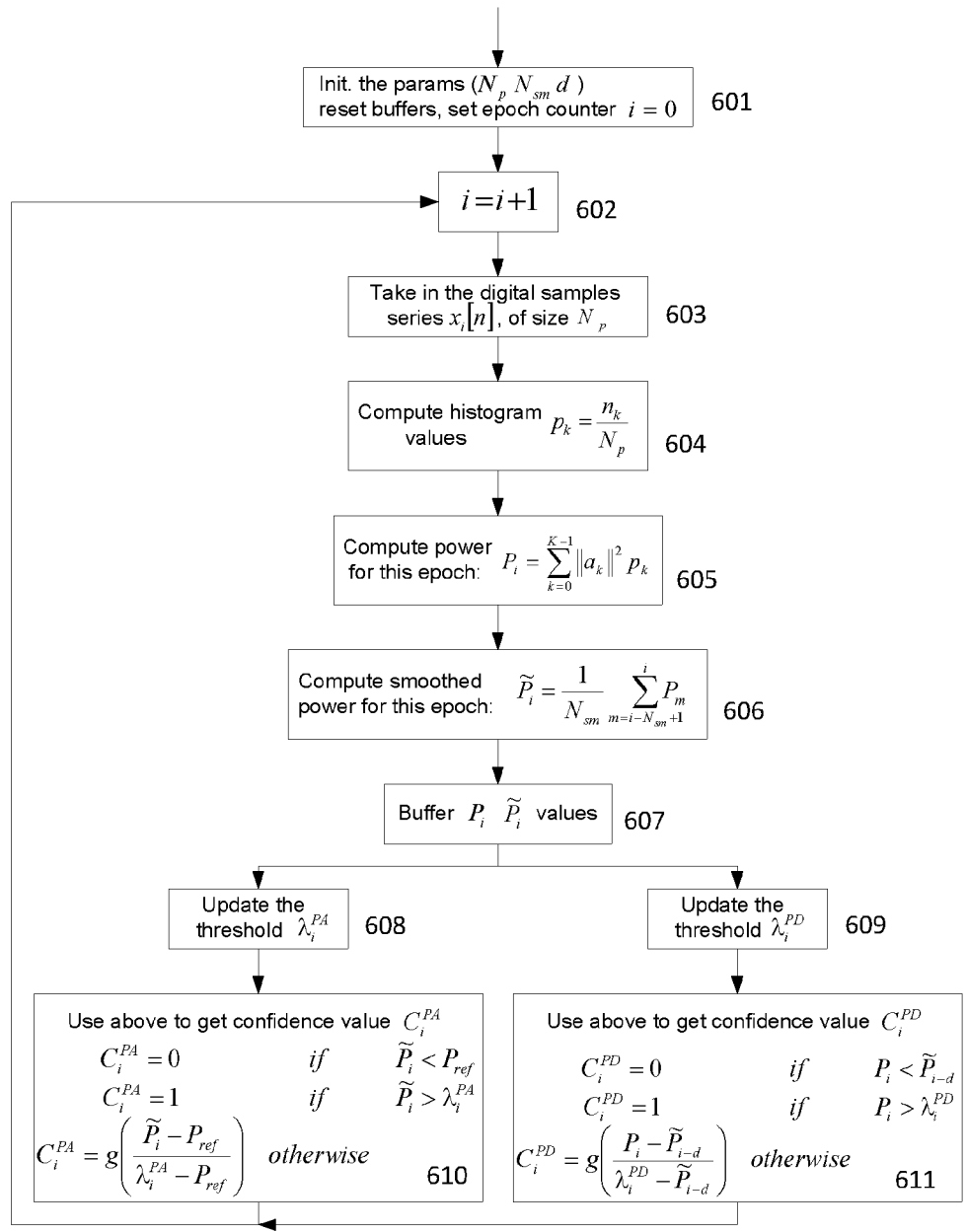
FIG. 6 shows a flowchart illustrating the power based detection algorithms.

The method used in performing the two power based detection algorithms is shown in FIG. 6. Initially all parameters are reset including the epoch counter (step 601), then for the current epoch (the count of which being increased by 1 at step 602), a unit-less quantity is calculated to represent the average power level (steps 603 to 606). This is defined as Power Quantity, which can be denoted as P. This average is taken over $N_p$ samples (step 603), which is a number less than or equal to the number of samples in the evaluation window $N_e$. The power quantity is computed by obtaining a histogram (step 604) from the digital data received from the front end 204 as an intermediary, which tallies the number of each data value received over the $N_p$ samples. The histogram has $K=2N_b$ points, where $N_b$ is the number of bits used to represent a sample. If the constellation is two-dimensional (i.e. both the real and imaginary components of the signal are sampled) then this will be ignored, and all samples treated as real, since the dimensions are orthogonal and symmetric. The computation (in step 605) of P, can be described by the following equation:

$$P = \sum_{k=0}^{K-1} \|a_k\|^2 p_k$$

where $a_k$ is the k-th histogram point, and $p_k$ is the k-th histogram value (i.e. the number of each data value $a_k$ in the set of samples measured divided by total number of samples $N_p$). The power value as measured in the two power based detection algorithms (the absolute power detection algorithm and the differential power detection algorithm) is defined as such.

In the absolute power detection algorithm, a reference power quantity, $P_{ref}$, is derived over a time window during which it is guaranteed there is no RFI present. The reference is computed by combining the estimated power quantities from several distinct time windows, the time windows spread over an extended time period, to get an accurate idea of the power variations. The mean of this set of readings is $P_{ref}$, and the variance is also taken and used to help select a threshold value above which it is certain an RFI event has been detected.

During each evaluation window, steps 606 and 607 are performed to computer the evaluation power quantity $P_i$, which is then smoothed to get $\tilde{P}_i$. The smoothing (step 606) is achieved with a moving average filter:

$$\tilde{P}_i = \frac{1}{N_{sm}} \sum_{m=i-N_{sm}+1}^{i} P_m$$

where $N_{sm}$ is the window size of the smoothing filter (which is set to 1 if no filtering is desired). In alternative embodiments a first order IIR filter is used:

$$\tilde{P}_i = (1-\alpha)\tilde{P}_{i-1} + \alpha P_i$$

where $\alpha$ is a smoothing factor. The calculated values $P_i$ and $\tilde{P}_i$ for the i-th epoch are then stored in memory (i.e. buffered) as step 607.

From the reference value, $P_{ref}$, an interference threshold, $\lambda_i^{PA}$, is obtained for the i-th epoch. This is the value above which it is certain an RFI event has occurred. The threshold may vary from one evaluation window to another, in order to compensate for the variation caused by the ambient environment or the electronic components of the receiver antenna 202 and front end 204.

In the branch of the process shown in FIG. 6 (steps 608 and 610) devoted to the absolute power detection algorithm, the "absolute power" threshold $\lambda_i^{PA}$ is updated (step 608). The threshold $\lambda_i^{PA}$ is based on a one-tailed statistical significance. One-tailed significance is chosen due to the fact that only the case that $P_i > P_{ref}$ is relevant, which reflects the scenario that higher power over the GNSS spectrum band has occurred. There are two components to the variance of $P_i$, one comes from the limited number of samples (which will be termed the sample variance), and the other comes from the variability in the power of the analog signal prior to the ADC (which will be termed the environmental variance). The environmental variance will depend upon many things such as the Sun, the Earth, the antenna temperature, the Front-End, the surroundings (if the antenna is briefly underground, say), and so on.

The analog signal received by the antenna 202 is modeled as zero-mean Gaussian with standard-deviation $\sigma_x(1+v_i)$, where $\sigma_x$ is the average signal strength, and $v_i$, which can vary from epoch to epoch, has zero mean and standard deviation $\gamma$. In an embodiment where the digital samples use 2-bit quantization (i.e. levels: −3, −1, +1, +3), the distribution of $P_i$ is approximated by:

$$E[P_i] = 1 + 8\mathrm{erfc}\left(\frac{2}{\sqrt{2}\,\sigma_x}\right),$$

$$VAR[P_i] = \frac{64}{N}\left\{\mathrm{erfc}\left(\frac{2}{\sqrt{2}\,\sigma_x}\right) - \mathrm{erfc}\left(\frac{2}{\sqrt{2}\,\sigma_x}\right)^2\right\} + \frac{64\gamma^2}{\pi\sigma_x^2}2^3 e^{-\left(\frac{2}{\sigma_x}\right)^2},$$

where the two variance terms are sample- and environmental-respectively. The '2' numerator in the complementary error-functions and the exponential terms used above refer to the quantization boundary, which is (±2). In another embodiment, the digital samples use 3-bit quantization. The extension of the distribution expression to 3 bits is given by:

$$E[P_i] = 1 + 8\left\{1\mathrm{erfc}\left(\frac{2}{\sqrt{2}\,\sigma_x}\right) + 2\mathrm{erfc}\left(\frac{4}{\sqrt{2}\,\sigma_x}\right) + 3\mathrm{erfc}\left(\frac{6}{\sqrt{2}\,\sigma_x}\right)\ldots\right\},$$

$$VAR[P_i] = \frac{64}{N}\left\{1^3\mathrm{erfc}\left(\frac{2}{\sqrt{2}\,\sigma_x}\right) + 2^3\mathrm{erfc}\left(\frac{4}{\sqrt{2}\,\sigma_x}\right) + 3^3\mathrm{erfc}\left(\frac{6}{\sqrt{2}\,\sigma_x}\right)\ldots\right\} -$$
$$\frac{64}{N}\left\{1\mathrm{erfc}\left(\frac{2}{\sqrt{2}\,\sigma_x}\right) + 2\mathrm{erfc}\left(\frac{4}{\sqrt{2}\,\sigma_x}\right) + 3\mathrm{erfc}\left(\frac{6}{\sqrt{2}\,\sigma_x}\right)\ldots\right\}^2 +$$
$$\frac{64\gamma^2}{\pi\sigma_x^2}\left\{2^3 e^{-\left(\frac{2}{\sigma_x}\right)^2} + 4^3 e^{-\left(\frac{4}{\sigma_x}\right)^2} + 6^3 e^{-\left(\frac{6}{\sigma_x}\right)^2}\ldots\right\}.$$

Again the error-function and the exponential terms in the numerators (2, 4, 6) are the boundaries for 3-bit quantization. Other embodiments use a higher number of bits, and the equations are extended accordingly in these embodiments. The threshold is set to achieve a certain level of false alarm by choosing it to be a certain number of standard deviations above the mean. In the present embodiment the threshold is defined by:

$$\lambda_i^{PA} = E[P_i] + 6\sqrt{VAR[P_i]},$$

whereas in other embodiments the threshold is higher or lower. The update of the threshold depends on new information. The mean $E[P_i]$ is constantly updated with more measurement values, and the variance $VAR[P_i]$ is adjusted if there is more knowledge of ambient temperature, the radio frequency environment of the probe, the level of ionospheric activity, and the noise temperature of the receiver antenna 202 and front end 204. In the present embodiment, part of this information is computed at the central server 100 and forwarded to the probes 102, 106 via the communications channel in order to reduce the computational load of the probe. In other embodiments the probes perform the entire computation.

Finally, as step 610 of the absolute power detection branch of the process shown in FIG. 6, a confidence value is obtained in order to perform the later detection fusion. The confidence value for this test is a number between 0 and 1 and is given by:

$$C_i^{PA} = 0 \text{ if } \tilde{P}_i < P_{ref}$$
$$C_i^{PA} = 1 \text{ if } \tilde{P}_i > \lambda_i^{PA}$$
$$C_i^{PA} = g\left(\frac{\tilde{P}_i - P_{ref}}{\lambda_i^{PA} - P_{ref}}\right) \text{ otherwise}$$

where $g(y)$ in this embodiment is a monotonically increasing function between 0 and 1, representing increasing confidence as the evaluated power approaches the threshold. Examples of this function in different embodiments are:

$g(y)=y$      linear $g(y)=\log(\zeta y+1)/\log(\zeta+1)$      log $g(y)=(e^{\zeta y}-1)/(e^{\zeta}-1)$      exp where $\zeta$ is a control factor. (In other embodiments, the value of g may be a set of discrete values). Given that it is desired that confidence only gets large as it approaches the threshold, the confidence function chosen in the present embodiment is exponential, with $\zeta=5$. In other embodiments this is tuned over time.

The confidence value $C_i^{PA}$ is passed into a decision fusion module.

In the differential power detection algorithm, instead of comparing the evaluated power quantity to the reference value $P_{ref}$ as in the absolute power detection algorithm, it is compared to a recent previous smoothed window value $\tilde{P}_{i-d}$ where d in this embodiment represents a 5-20 second gap. In other words, if the power in this epoch is significantly greater than it was 5-20 seconds ago, then $(P_i - \tilde{P}_{i-d})$ will be large. In this embodiment, the smoothed window value $\tilde{P}_{i-d}$ has the same window size as in the absolute test, whereas in other embodiments the window size is different.

The benefits of having both absolute and differential tests are twofold. Firstly, if the power is lower than expected (e.g. due to environmental factors) and jumps back to normal very suddenly, this is indicative of an interference source being switched on, but will not necessarily trigger the absolute test. Secondly, upon switching on the Detector processes, this test will be ready to detect after only 5-20 seconds, whereas the absolute test may take minutes/hours to gather enough data to proceed.

The differential power detection algorithm is performed by performing steps 609 and 611 of the process shown in FIG. 6. The differential power detection algorithm uses a threshold, $\lambda_i^{PD}$. The computation and update of the threshold for this test follows a similar method as described in the absolute test, however the term $v_i$ with standard deviation $\gamma$ will be different. In this case it will reflect the fact that the environment will be changing slowly, for instance the antenna cannot change temperature much over 5-20 seconds.

Then $P_i$ and the threshold $\lambda_i^{PD}$ are treated in a similar manner to the absolute test to obtain a confidence value as shown in step 611 of FIG. 6:

$$C_i^{PD} = 0 \text{ if } P_i < \tilde{P}_{i-d}$$

$$C_i^{PD} = 1 \text{ if } P_i > \lambda_i^{PD}$$

$$C_i^{PD} = g\left(\frac{P_i - \tilde{P}_{i-d}}{\lambda_i^{PD} - \tilde{P}_{i-d}}\right) \text{ otherwise}$$

The steps (602 to 611) described above are then repeated for successive epochs. The following should be noted in relation to the absolute and differential power detection algorithms of the present embodiment:

In order to eliminate the power variation introduced by the receiving front end 204, the gain applied during the receiving front end processing needs to be kept constant during the overall operation period, or the adjustment, if any, needs to be provided to the $P_i$ computation block illustrated in FIG. 6 to compensate for this probe-introduced variation.

In some embodiments it is necessary to overcome the above constraint, as the overall gain is varying due to the Automatic Gain Control implementation and the exact variation is not available to the computation entities. In these embodiments, a second Power Quantity estimation is used. This method is also beneficial for embodiments where the AGC is implemented to improve the input matching to the ADC. The control voltage $V_i$ to the Variable Gain Amplifier (VGA) is sampled by a separate ADC, and fed to the computing module to obtain the Power Quantity values. The relationship between VGA gain $G_A$ and its control voltage signal $V_A(t)$ and the gain value $G_v(t)$ can be represented as:

$$G_v(t) = \alpha e^{\beta V_A(t)}$$

where $\alpha$ is the AGC gain coefficient, and $\beta$ is the control voltage coefficient. The gain design objective is to adjust the $G_v(t)$ so that the Root-Mean-Squared (RMS) signal amplitude into the ADC is maintained at the optimal value for the ADC operation. The above relationship can be manipulated to:

$$V_A(t) = \frac{1}{\beta} \ln\left(\frac{G_v(t)}{\alpha}\right)$$

If assuming the gain value that optimizes the input signal amplitude to the ADC when there is only thermal noise (with GNSS signals buried underneath) is $G_o$, and the corresponding control voltage is $V_o$, then any increase of the input signal power to the receiver front end will drive the AGC to reduce $V_A(t)$ to reduce $G_v(t)$ so that eventually the input signal amplitude to ADC can be reduced to its optimal value. Therefore, the measurement of $V_A(t)$ has equivalent effect to P, and the similar absolute test metric and differential metric can be defined in the same way as above, only with $V_A(t)$ instead of P. The ADC used to convert the analog voltage signal $V_A(t)$ is only required in embodiments where the receiver has an integrated AGC and only the control voltage is an output. An alternative embodiment disables the integrated AGC, and implements a "soft AGC" whose control circuit is implemented in the computation modules. In this case, the digital form of $V_A(t)$ is already available.

As mentioned above, spectrum-based detection algorithms are also performed, a first using absolute spectrum values and the other using differential values. The two spectrum-based detection algorithms are designed to enable insights into the details of the RFI. As the RFI usually has specific characteristics in frequency, the spectrum-based algorithms transform the time series of the signals into the frequency domain so that the presence of any abnormal emission of the radio frequency signals in the frequency domain can be more distinctly identified. The designed method is based on the non-parametric-based periodogram and statistical hypothesis test. This method has superior performance to the power based method when the interference has its power in a much smaller bandwidth than the receiver front end 204. Conversely, if the power is spread evenly over a wide bandwidth the power based method should outperform the spectrum based method.

Figure 7:
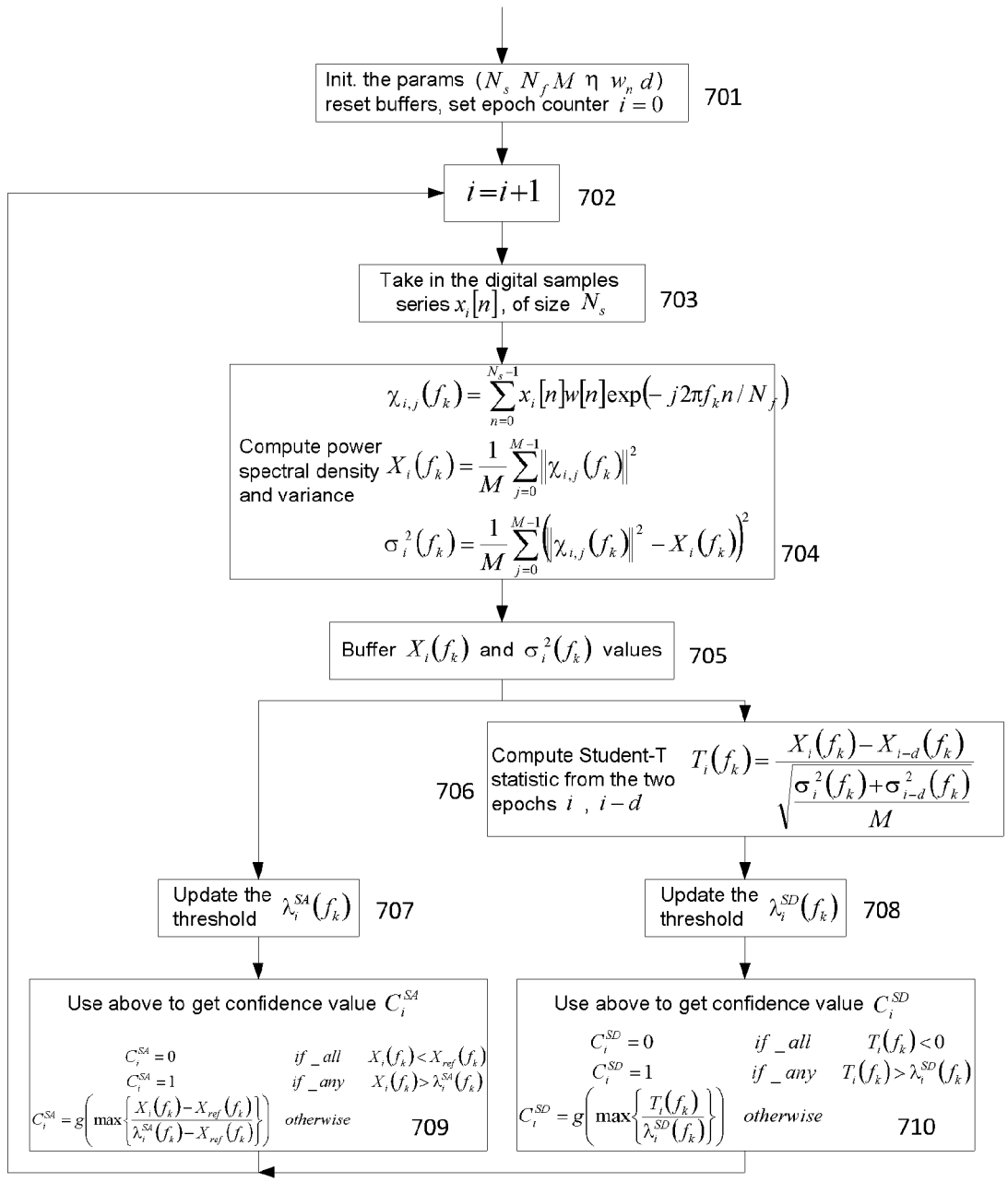
FIG. 7 shows a flowchart illustrating the spectrum based detection algorithms.

FIG. 7 shows the steps performed in carrying out the method of the two spectrum-based detection algorithms. There are several parameters that must be chosen for the method. As an initial step all such parameters are reset (step 701) including the epoch counter, the count of which being increased by 1 at step 702. For each epoch $N_e$ samples are available to compute the spectrum estimate using Welch's method. It is worth pointing out that this window shall be shorter than the window over which the process is WSS (has wide-sense stationarity). From the overall window, overlapped blocks are taken with $N_s$ samples per block and an overlap ratio of $\eta$ between the two consecutive blocks (step 703). The number of blocks taken is given by M. It is worth pointing out that the FFT (Fast Fourier Transform) size $N_f$ (greater than or equal to $N_s$) will determine the frequency resolution of the computed spectrum, and M will determine the variance of each point on the spectrum. If $N_e$ is very large, then $\eta$ can be negative, meaning that instead of an overlap there is a gap between the Welch blocks. On the other hand, $\eta$ should not be greater than 0.5, so together $\eta$, $N_s$, and M can be used to set the minimum value of $N_e$ that should be used in the system.

The power spectral density and variance for the i-th epoch is calculated using Welch's method (step 704). To carry out Welch's method of estimating the power spectral density for the epoch $X_i(f_k)$ from the input signal $x_i[n]$ each of the M blocks of size $N_s$ is windowed, FFT'd, and squared, and then the mean is taken:

$$\chi_{i,j}(f_k) = \sum_{n=0}^{N_s-1} x_i[n]w[n]\exp(-j2\pi f_k n/N_f), \; j = 0, \ldots, M-1$$

$$X_i(f_k) = \frac{1}{M}\sum_{j=0}^{M-1} \|\chi_{i,j}(f_k)\|^2$$

where $w[n]$ is the window (e.g. Hanning), and $f_k$ is the k-th discrete frequency bin.

The variance of each spectrum is also ascertained in step 704, which makes use of the M blocks that make up the Welch spectrum estimate:

$$X_i(f_k) = \frac{1}{M}\sum_{j=0}^{M-1} \|\chi_{i,j}(f_k)\|^2$$

-continued $$\sigma_i^2(f_k) = \frac{1}{M} \sum_{j=0}^{M-1} (\|\chi_{i,j}(f_k)\|^2 - X_i(f_k))^2$$

The calculated values for $X_i(f_k)$ and $\sigma_i^2(f_k)$ for the i-th epoch are then stored in memory (i.e. buffered) as step 705.

With the spectrum estimation defined, the detection metrics obtained are based on two different statistical hypotheses tests: the absolute spectrum based detection algorithm (steps 707 and 709) and the differential spectrum based detection algorithm (steps 708 and 710).

Similar to the absolute power based detection algorithm, a reference spectrum is obtained over time by combining the estimated spectrums over many epochs. The mean of these is $X_{ref}(f_k)$ and the variance is again used to decide the choice of threshold above which it is certain there has been an RFI event. Note that the reference and the threshold here are both vectors, of length $N_f$.

For the i-th evaluation epoch the spectrum estimate $X_i(f_k)$ is obtained. The threshold for this epoch, $\lambda_i^{SA}(f_k)$ is taken from a one-tailed significance test (step 707), as in the absolute power based detection algorithm. Finally, a confidence metric (step 709) is computed from the reference, threshold, and evaluation values, and passed to the detection fusion module.

It is desired that the confidence metric, $C_i^{SA}$, for the absolute spectrum-based test be a scalar value, as the other confidence metrics are. In order to do this, the confidence for each point is taken in a similar way to the power-based detection algorithms, and only the maximum value is kept. This results in:

$$C_i^{SA} = 0 \qquad \text{if \_all } X_i(f_k) < X_{ref}(f_k)$$
$$C_i^{SA} = 1 \qquad \text{if \_any } X_i(f_k) > \lambda_i^{SA}(f_k)$$
$$C_i^{SA} = g\left(\max\left\{\frac{X_i(f_k) - X_{ref}(f_k)}{\lambda_i^{SA}(f_k) - X_{ref}(f_k)}\right\}\right) \qquad \text{otherwise}$$

where the 'max' function is taken over the frequency bins, $f_k$.

In the case of the differential spectrum based detection algorithm, the spectrum of the i-th epoch is compared to the (i-d)-th epoch. For this case, the variance, $\sigma_i^2(f_k)$, of each spectrum as calculated in step 704 is used. For each of the computed PSD frequency bins, the corresponding pair between the reference and the evaluation is used to decide if RFI is present. The test is based on the two sampled T test. The two sampled T test is appropriate for comparing two samples that are less constrained in terms of normality. With the above steps, the test statistic of the i-th epoch may be computed according to:

$$T_i(f_k) = \frac{X_i(f_k) - X_{i-d}(f_k)}{\sqrt{\frac{\sigma_i^2(f_k) + \sigma_{i-d}^2(f_k)}{M}}}.$$

The statistic is student-T distributed with a degree of freedom of (2M−2). If M is large the Gaussian distribution assumption can be valid, and the threshold may be based on the reference alone. For a desired false alarm rate, a detection threshold $\lambda_i^{SD}(f_k)$ can be derived/updated (step 708) from the distribution, and this threshold value can be the same for all the frequency bins or different (useful if some areas of the spectrum hold more interest).

Again, it is desired that the confidence metric, $C_i^{SD}$, for the differential spectrum based detection test be scalar. The metric, $C_i^{SD}$, is calculated (step 710) as follows:

$$C_i^{SD} = 0 \qquad \text{if \_all } T_i(f_k) < 0$$
$$C_i^{SD} = 1 \qquad \text{if \_any } T_i(f_k) > \lambda_i^{SD}(f_k)$$
$$C_i^{SD} = g\left(\max\left\{\frac{T_i(f_k)}{\lambda_i^{SD}(f_k)}\right\}\right) \qquad \text{otherwise}$$

where the 'max' function is taken over the frequency bins, $f_k$. The steps (702 to 710) described above are then repeated for successive epochs.

As mentioned above, two measurement-based detection algorithms are also performed. They consist of first detection test using absolute values as derived from measurements made using the COTS GNSS receiver 206 and a second detection test using differential COTS measurement values. The COTS measurement based detection algorithms may, in variations of the embodiment process, various outputs including one or more of the following: tracking measurements, satellites information processing, and receiver position, velocity and time computation. The detection algorithms are based on the receiver's tracking measurements as well as the satellites' information.

Figure 8A:
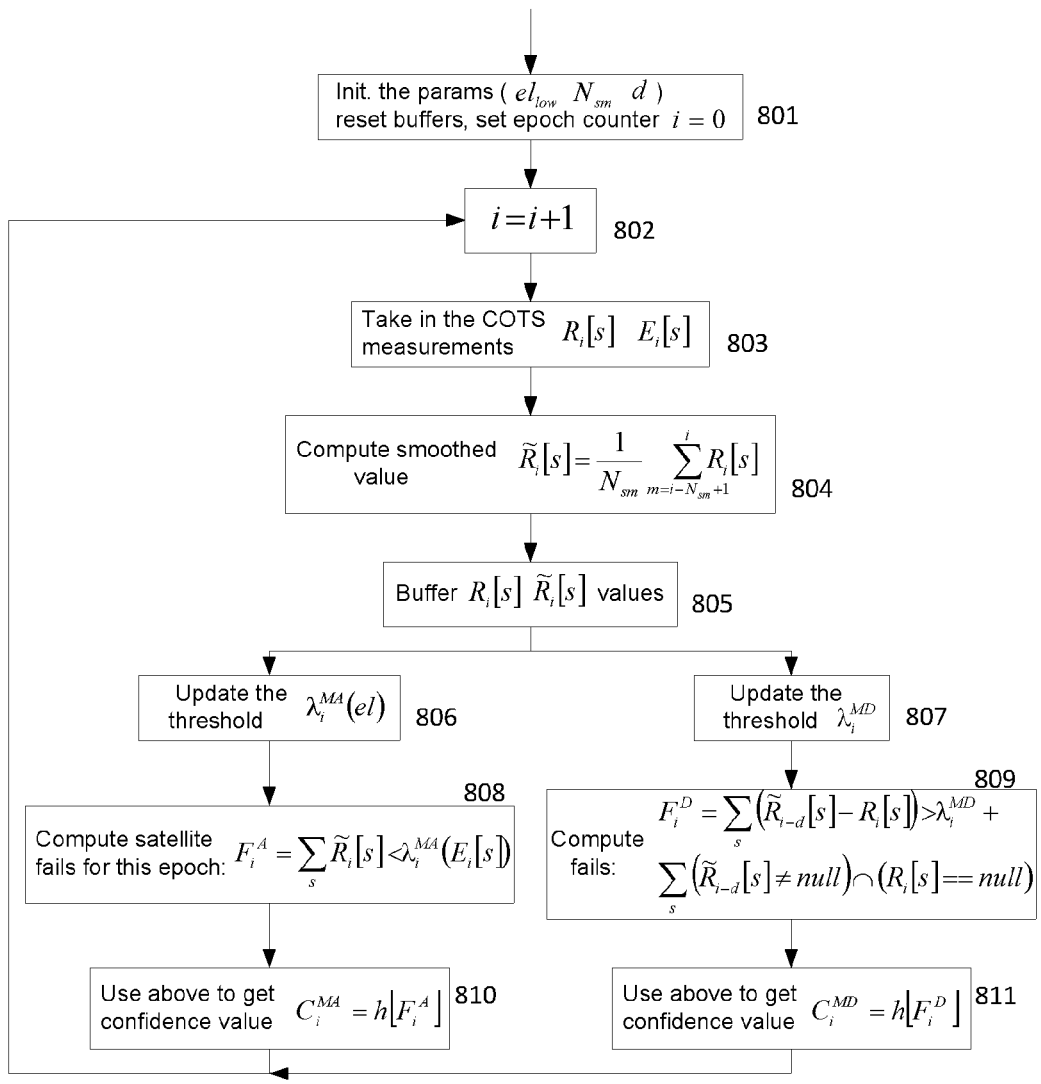
FIG. 8a shows a flowchart illustrating the measurement base detection algorithms.

FIG. 8a shows the steps performed in carrying out the method of the two COTS measurement-based detection algorithms of the present embodiment. There are several parameters used and as an initial step all such parameters are reset (step 801) including the epoch counter, the count of which being increased by 1 at step 802.

The COTS measurement that is used for detection in this embodiment is primarily based on the signal to noise ratio (SNR), or more specifically for GNSS COTS receiver 206 the carrier to noise density ratio ($CN_0$). In the static deployment scenario, the environment of the site where probes are deployed is known or can be well surveyed. Therefore, the relationship between the $CN_0$ measurements and the satellites position, in the form of elevation and azimuth angles to the receiver antenna, can be well modeled and it remains relatively constant when RFI is absent. When RFI is present, this modeled relationship will be violated as the overall noise plus interference level which the receiver experiences increases. Based on this fact, it is possible to detect the presence of RFI using this modeled relationship between $CN_0$ measurements and satellite positions.

The two COTS measurement-based detection algorithms are used due to their relatively low complexity, and the fact that they clearly demonstrate the degree to which the interference is causing degradation to the GNSS systems.

Measurements are only considered valid over the elevation range [$el_{low}$,90], where $el_{low}$ is the "guard zone" to avoid multipath problems from low angle satellites. As shown in step 803 of FIG. 8a, at the i-th epoch, the COTS receiver will pass on two vectors, the vector of $CN_0$ readings, $R_i[s]$, and the elevation angles, $E_i[s]$, where s is the satellite number. In one embodiment, all of these values are integers as this is how most of current COTS receivers operate. In other embodiments the values in $R_i[s]$ and $E_i[s]$ are rounded.

At step 804, a smoothed value $\tilde{R}_i[s]$ is calculated (using data only from valid elevation angles) as:

$$\tilde{R}_i[s] = \frac{1}{N_{sm}} \sum_{m=i-N_{sm}+1}^{i} R_i[s]$$

The calculated values $R_i[s]$ and $\tilde{R}_i[s]$ for the i-th epoch are then stored in memory (i.e. buffered) as step 805.

The absolute measurement-based detection algorithm (steps 806, 808, and 810) compares current smoothed values with a reference as in the previous "absolute" algorithms. In this embodiment the reference computation is on a per satellite basis. The advantage of the per-satellite based reference computation is that it allows the relationship between $CN_0$ and the satellite position (el, az) to be more accurately modeled. This makes it possible to set a tighter threshold for the detection, which leads to a better detection performance in terms of rate of detection and false alarm. In other embodiments all satellites may share a threshold, which requires a shorter monitoring period before the absolute measurement-based detection can commence. The detailed procedure of reference computing and updating is provided below.

Unlike the power/spectral cases, it is important here that a long reference is taken. A minimum reference time of 12 hours is selected in the present embodiment, but 24 hours or longer is selected in other embodiments. It may be advantageous to update the reference regularly, using the measurement data collected when RFI is absent and the detector probe is online operating in an evaluation phase. These regular updates eliminate the variation caused by the impact of atmosphere temperature in the winter and the summer. In addition, the external information that is available at the central server 100, such as the information of the ionospheric activity, is used to compute adjustment that is needed for the threshold and this adjustment will be sent to the probe.

During the initial deployment phase, the probe logs the measurements, and at the end of this period of $N_{ref}$ epochs, the reference $CN_0$ at each elevation angle is computed, as well as the variance. First, the number of readings at each el value is:

$$N_r(el) = \sum_s \sum_{i=0}^{N_{ref}-1} (E_i[s] == el)$$

The reference $CN_0$ estimate is:

$$CN_0(el) = \frac{1}{N_r(el)} \sum_s \sum_{i=0}^{N_{ref}-1} R[i,s] * (E_i[s] == el)$$

and the estimated variance is:

$$\sigma^2(el) = \frac{1}{N_r(el)} \left\{ \sum_s \sum_{i=0}^{N_{ref}-1} R_i[s] * (E_i[s] == el) - CN_0(el) \right\}^2$$

If any of the $N_r(el)$ values are too small (below a number that is tuned), then there are deemed to be too few values for accurate estimation of $CN_0(el)$ and $\sigma(el)$ at this value of el, and so these values are replaced by a third order polynomial curve fitting applied to the remaining values.

A threshold $\lambda_i^{MA}(el)$ corresponding to the reference mean value is now computed/updated (step 806). In one embodiment a one-tailed significance test can be applied with $CN_0(el)$ and $\sigma(el)$. In an alternative embodiment, which will be better when the Gaussian assumption does not hold, the so called discrete scattering is used to set the threshold for each elevation angle. As illustrated in FIG. 8b for each elevation angle, the $CN_0$ value is scattered within a range especially for the low elevation angle range. Different shades of grey of the circles plotted in the graph of FIG. 8b represent different percentages of the occurrence. For instance, at elevation angle of 49 degrees, there is a circle having a shade of grey representing 90 percent of an observed $CN_0$ of 51 dBHz, and a different circle having a shade of grey representing 10 percent of an observed $CN_0$ of 49 dBHz from the collected reference data. Therefore, if the threshold is set at 49 dB, the system has an individual satellite false alarm rate of 10 percent. Similar to the mean case, the threshold is extrapolated for some of the elevation angles. In the graph of FIG. 8b, the upper solid line is the corresponding mean $CN_0$ computed from the data collected over a 2 day period, and the lower dashed line represents this mean minus twice the standard deviation computed from the same data set. It can be seen that between elevation angle of 46° and 48° 100% of the measurements collected are at 50 dBHz, and therefore, the computed variance for these values are zero.

The following points are noted:
- With the per-satellite based reference computation, the variation among the satellites' transmission power level due to the age and model of the satellites is eliminated. For example, this variation can be as large as 3 dB between the new and the old GPS satellites.
- Also the per-satellite based reference computation allows applying different weighting factors to each of the satellites whose $CN_0$ measurements are used for the evaluation to derive a more accurate detection result. For example, in one embodiment the GEO-stationary satellites are given higher weighting factor than the MEO satellites due to their fixed relative position to the probe.

After this long reference gathering stage, $\lambda_i^{MA}(el)$ is obtained, and the probe is ready to start the evaluation computation process.

As mentioned above, for the i-th epoch, the results vector is smoothed to obtain $\tilde{R}_i[s]$. This is a measure of the average measured $CN_0$ of each (valid) satellite. At step 808, each of these values is compared to the threshold, at that satellite's elevation, and the number below the threshold is tallied:

$$F_i^A = \sum_s \tilde{R}_i[s] < \lambda_i^{MA}(E_i[s])$$

where $F_i^A$ represents the number of satellites failing the test (i.e. the signal-to-noise ratio is below the threshold). The confidence function g(y) used in the previous tests is designed for continuous data, and so is unsuitable for the integer $F_i^A$. Instead, a discrete confidence function h[y] is designed, based on testing that has been carried out:

$$h[y] = 0 \quad \text{if } y = \{0, 1\}$$

$$h[y] = \frac{y-1}{3} \quad \text{if } y = \{2, 3\}$$

$$h[y] = 1 \quad \text{if } y \geq 4$$

The function h[y] will change in other embodiments where many GNSS constellations and/or frequencies are monitored. A scalar confidence value, $C_i^{MA}$, for the absolute measurement based detection test may then be calculated in step 810 as:

$$C_i^{MA} = h[F_i^A]$$

This value, $C_i^{MA}$, is then passed to the fusion detection engine module. This absolute measurement based detection test is effective for detecting long persistent interference.

In the differential measurement based detection algorithm, shown in steps 807, 809 and 811 of FIG. 8a, the current epoch's measurements $R_i[s]$ are compared with those from a smoothed recent epoch $\tilde{R}_{i-d}[s]$. The threshold $\lambda_i^{MD}$ used in the algorithm comes from testing based on the real data collected from a network of GNSS monitoring stations. For a well sited antenna this threshold will usually be 2 dB, reflecting the consistent nature of the satellite transmissions. The threshold $\lambda_i^{MD}$ may be updated as required (step 807), and may for example be tuned by the central server 100 if too many false alarms are suspected.

It is important for the differential measurement based detection algorithm to capture both of the following; the case where $R_i[s]$ value is too low and $E_i[s]$ is still valid, meaning that the performance level has fallen (possibly due to interference), and the case where $R_i[s]$ and/or $E_i[s]$ is null, but $\tilde{R}_{i-d}[s]$ is valid, meaning that this satellite is no longer being tracked, and has been lost by the COTS receiver. This is calculated (step 809) as:

$$F_i^D = \sum_s (\tilde{R}_{i-d}[s] - R_i[s]) > \lambda_i^{MD} + \sum_s (\tilde{R}_{i-d}[s] \neq \text{null}) \cap (R_i[s] == \text{null})$$

The confidence value calculated (step 811) and passed on to the fusion detection engine, is $C_i^{MD} = h[F_i^D]$.

A summary of the six different detection algorithms and their keys values is shown in FIG. 9. The following notes are made about the threshold values:

$\lambda_i^{PA}$ is based on a large set of captures for $P_{ref}$, and the variance of these will be assumed Gaussian $\lambda_i^{PD}$ is based on the known variability of the front-end at the operating level (obtained from testing), with a margin for error $\lambda_i^{SA}(f_k)$ is based on a large set of captures for $X_{ref}(f_k)$, and the variance of these will be assumed Gaussian $\lambda_i^{SD}$ is based on the Student-T distribution $\lambda_i^{MA}(el)$ is based on a large set of measurements for $CN_0(el)$, and either the variance or the discrete scattering of these measurements $\lambda_i^{MD}$ based on testing of COTS receivers and on Ordnance Survey GNSS sites.

The results each of the six detection algorithms ($C_i^{PA}$ $C_i^{PD}$ $C_i^{SA}$ $C_i^{SD}$ $C_i^{MA}$ $C_i^{MD}$) are input into the detection fusion algorithm engine (box 309 of FIG. 3), to make a final decision as to whether there has been a detection of an RFI.

To decide whether RFI is present or absent, various logical tests are applied. Those currently chosen are listed below, and reflect experience of both how well the tests perform, and how various different classes of interference will present themselves in the different tests. It is noted that the system architecture is flexible to update the logic following initial deployments based on the data mining process at the central server, and so further logic tests are able to be added to the algorithm.

The detection flag is set if any of the following occur:

$$C_i^{PA} + C_i^{PD} \geq 1 \qquad 1.$$

$$C_i^{SA} + C_i^{SD} \geq 1 \qquad 2.$$

$$C_i^{MA} + C_i^{MD} \geq 1 \qquad 3.$$

$$C_i^{PA} + C_i^{SA} + C_i^{MA} \geq 1.5 \qquad 4.$$

$$C_i^{PD} + C_i^{SD} + C_i^{MD} \geq 1.5 \qquad 5.$$

The following is noted:

This means that if any of ($C_i^{PA}$ $C_i^{PD}$ $C_i^{SA}$ $C_i^{SD}$ $C_i^{MA}$ $C_i^{MD}$)=1, then the global flag is raised. Each of the thresholds for the tests is designed so that it is very unlikely that they will be exceeded without RFI. Therefore if any have a confidence of 1, the global flag should be set.

If two tests on the same basis both have a high confidence, but not quite 1, then together they are enough to raise the global flag.

In the measurement-based case of point 3, if three satellites fail the absolute test, and two satellites fail the differential test (or vice versa), that is just enough to raise the global flag. Two fails in each will not do so.

From experience, a ST jammer will cause point 2 to flag more easily than the others.

From experience, a white noise jammer will cause point 1 to flag more easily than the others.

A slow and steady increase up to a high jammer power will cause point 4 to flag more easily than the others.

A sudden sharp pulse of jamming will cause point 5 to flag more easily than the others.

Point 3 will also be likely to notice if there is a physical interference, for example if someone puts a large metallic object too close to the antenna (maliciously or accidentally).

Once the global detection flag is set, the characteristic parameters that are required for classification will be extracted from the detection results, and fed to the RFI classification engine (see blocks 310 and 311 of FIG. 3).

The RFI classification algorithm performs an RFI classification once the detection has been flagged from the RFI detection fusion algorithm. It is noted that the purpose of this functional block on the primary probe 102 is to prioritise the RFI event urgency level so that appropriate actions can be taken by the following functional blocks and at system level. Therefore, although the description includes the entire classification and classification algorithm, as this entire algorithm is implemented on the primary probe 102, the active processing steps are configured and controlled by the central server 100 in order to optimise the utilisation of the primary probe 102 processing capability. This entire classification algorithm is also implemented at the central server 100, but with a more sophisticated configuration.

The classification algorithm is a "flow-chart classification & classification method". This method consists of four major operational stages which form a "closed-loop" at the system level:

A-priori RFI property analysis: To build a lookup table for the properties of different types of known and potential RFI via offline analyses.

Classification Algorithm Design: Relying on the a-priori property lookup table, build a set of DSP tests so that an unknown RFI can be assigned to a certain class of interference (e.g. single-tone, white, chirp, etc.) during the online processing.

Detailed parameterisation and classification: A more sophisticated analysis at the central server to decide characteristics and values of specific parameters of the detected RFI signal.

Database training and updating: The "newly" characterised RFI and its properties are added to the database, which is used to train the overall system design.

During the offline RFI property analysis stage, the signal types and the characteristics are summarised as described in FIG. 10. Note that the five characteristics listed are not a complete set. The table shows that if tests can be designed to determine which characteristics a signal has, then an RFI could be tested and classified, or at least limited to one of two/three classes. This table shows some of the individual tests that can be designed.

It is noted that there are several question marks on the table, where the answer is unknown. This is in partly due to imperfect knowledge of jammers, partly because it will depend on how certain classes of jammers are realised (analogue/digital signal generation), and partly because many of these classes of signal do not exist or have not been observed, but simply have the potential to exist.

It may be judged that some tests are redundant, depending on the order they are carried out. For instance, if the RFI is determined to NOT be spectrally periodic, there is little benefit in testing if it is pulsed/power varying. Also there is little benefit in testing if the RFI is jumping in frequency unless it has already been established that it is frequency-varying.

An important point not highlighted in the table is that most of the individual tests will have better performance when there are only a limited number of classes being tested.

Figure 11:
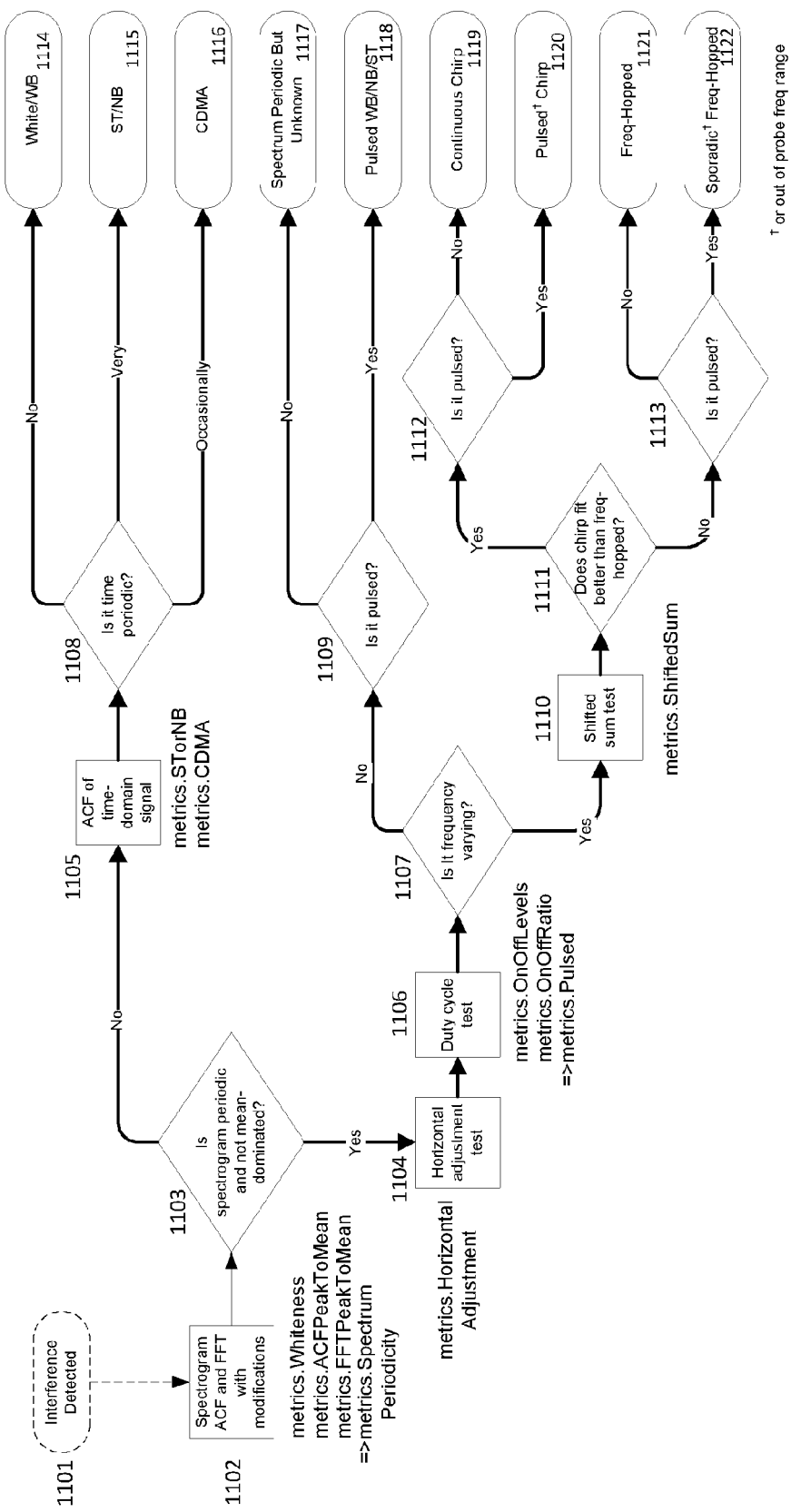
FIG. 11 shows an embodiment of the classification decision tree.

In accordance with the present embodiment, the top-level classification method used is in the form of a decision tree flowchart as shown in FIG. 11. There are several benefits achieved by means of the flowchart of FIG. 11:

There is small overall complexity

The most complex individual tests are avoided where possible

Early tests are more discriminatory (have fewer question marks)

Early tests are more accurate

Early tests are able to handle a wide variety of inputs

As mentioned above, the use of the decision tree is triggered by the detection of RFI interference (step 1101). A spectrogram is taken, as well as the ACF and FFT of the spectrogram along with modifications of the results as described herein (step 1102). It is then decided whether the spectrogram is periodic and not mean-dominated (step 1103).

If the spectrogram is periodic and not mean-dominated, then a horizontal adjustment test and a duty cycle test is performed (steps 1104 and 1106 respectively—described in further detail later). It is then decided if the spectrogram is frequency varying based on these tests (step 1107). If it is frequency varying, then a shifted sum test is performed (step 1110—described in further detail later) and it is decided if the signal is chirped or frequency hopped based on the shifted spectrogram produced by the shifted sum test (step 1111—described in further detail later). A decision on the type of signal is then made based on whether the signals are pulsed (step 1109, 1112 or 1113 depending on the results of the previous steps). In the present embodiment, for periodic and not mean-dominated signals, the possible results could be: spectrum periodic but unknown 1117, pulsed WB/NB/ST (wideband, narrowband or single tone) 1118, continuous chirp 1119, pulsed chirp 1120, frequency hopped 1121 or sporadic frequency hopped 1122. Result 1122 would also be achieved where a frequency hopping signal has a frequency range greater than the probe frequency range.

If, after step 1103, the spectrogram is not periodic and not mean dominated, then the ACF of the time-domain signal is taken (step 1105) and it is decided from this whether the signal is time periodic (step 1108). If it is not periodic, the signal is characterised as white/NB (1114). If it is very periodic, the signal is characterised as ST/NB (1115). If it is occasionally time periodic, i.e. not strongly periodic, then the signal is characterised as a CDMA signal (1116). The characterisation process is described in further detail below.

There are five sub-processes—performed in order to derive the metrics to input to the branching decision making. The spectral periodicity is tested for first (step 1103). This is because it matches the objectives listed; it is very discriminatory (the only question mark it has is for CDMA and that has been resolved by tuning the test algorithm), it is not the most complex test, and experimentation shows it to be accurate with a variety of inputs. The frequency varying property (steps 1104, 1106 and 1107) is tested for before the frequency jumping property, the power varying property is only tested for if it is frequency varying (steps 1110 and 1111), and the most complex test, by experience the time periodicity test (steps 1105 and 1108), is avoided for many types of RFI.

The spectrally periodic test takes the spectrogram as the input. The test is intended to determine if there is spectral periodicity.

In programming terms, the spectrogram is a 2-dimensional matrix, with time in the horizontal dimension, and frequency in the vertical dimension, each value in the matrix being representative of measured signal power over a single (narrow) frequency band centred on a given frequency and over a (narrow) time window centred at a given time. A single column of the matrix then shows all the frequencies in a very short time instant, and a single row shows how the power of a specific frequency changes over time. Two-dimensional representations of spectrograms are shown in FIGS. 12a to 12e, some being partially or fully signal-processed, each spectrogram is a plot of power (represented by the shade of grey used at a given data point) with the horizontal axis representing time and the vertical axis representing frequency.

Figure 13:
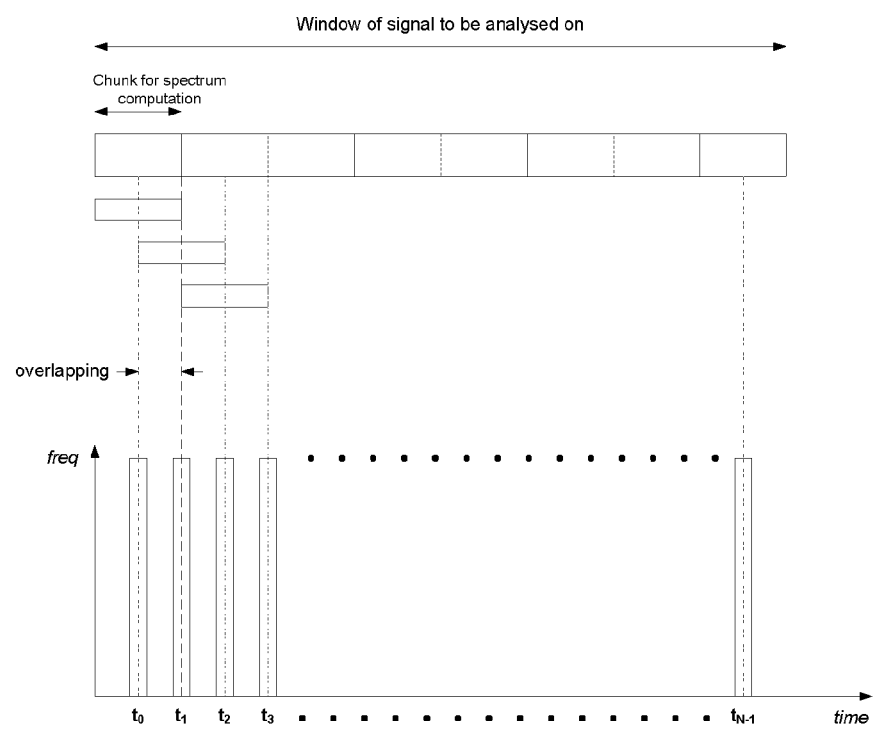
FIG. 13 shows a schematic of the spectrogram computation.

In order for the spectral periodicity test (step 1103 of FIG. 11) to produce accurate branching especially when the RFI signal strength is low, which is important given the fact that this test is at the first level of branch tree, the estimate of the RFI's spectrogram needs to be accurate. In this invention, the "Welch" method is applied to compute the spectrogram (step 1102). The computed spectrogram is stored in the memory of the probe 102, 106 and re-used for the rest of the processes. FIG. 13 illustrates this spectrogram computation method. As is well known with the "Welch" method, for a given time window of the signal to be analysed, the larger over-lapping ratio between the consecutive chunks on which the spectrum is computed, the smoother the spectrum transition between these two chunks in time domain. On the one hand, having smooth spectrogram data may improve the performance of the Horizontal Adjustment Test and Shifted Sum Test (steps 1104 and 1110 respectively) to be described in further detail below. On the other hand, larger overlapping results in higher correlation between the consecutive time bins of the spectrogram which deteriorates the Spectrally Periodic Test (step 1103). So a well-designed overlapping ratio is important for the tests to result in good performance. In this embodiment of the invention, two different approaches are implemented at the primary probe 104 and at the central server 100. At the primary probe 104, a balanced overlapping ratio is chosen so that the computed spectrogram estimate provides fair performance for all the tests. This is due to the computational and latency constraints for the RFI classification algorithm on the primary probe 104. Due to these constraints, as well as the high computational complexity of spectrogram computation, it is desired to compute the spectrogram for a window of the signal only once. The computed spectrogram is then used as input for all the rest of the tests. In the central server 100, two spectrogram estimates can be computed with two different over-lapping ratios, and the one with lower over-lapping ratio is used for the Spectrally Periodic Test whereas the one with higher over-lapping ratio is used for the Horizontal Adjustment Test and Shifted Sum Test. This option exists because the central server 100 has higher computational capability, and the latency requirement is less demanding when the signal is analysed at the central server 100.

Figure 14:
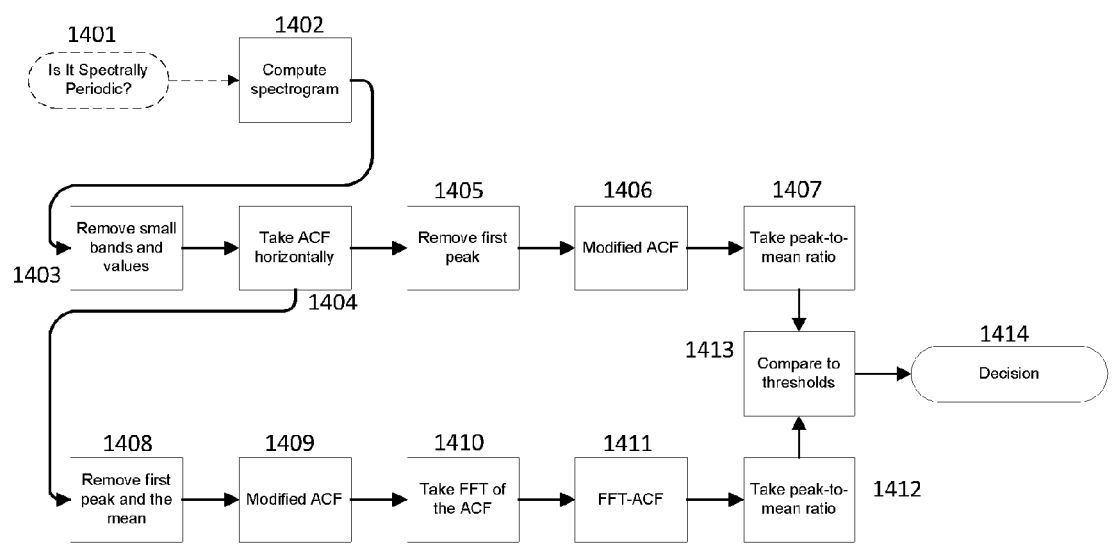
FIG. 14 shows a flowchart for the spectrally periodic test.

The process of the Spectrally Periodic Test is illustrated in FIG. 14. Once the spectrogram estimate is computed (step 1402), pre-processing for the spectrogram is applied. This pre-processing removes any frequency bands that have minimal energy in them, as they are assumed to contain no useful signal. Then any points on the spectrogram that have low energy are assumed to be noise, and are zeroed (step 1403). This process generates a so called "modified spectrogram".

Then the Auto-Correlation Function (ACF) of the modified spectrogram is computed along the time dimension, "horizontally" (step 1404). This means that each row of the spectrogram has its ACF taken, and the resulting row vectors are summed. The resulting original ACF is used to produce a first modified ACF by removing the initial peak at zero lag and the remaining D.C. term (steps 1408 and 1409). The modification improves the identification of the spectral periodicity. Once this modification has been performed, this first modified ACF is transformed into the frequency domain via a Fast Fourier Transform (FFT) (step 1410) to produce an "FFT-ACF" (1411). The original ACF is also modified by removing the initial peak at zero lag only (step 1405) to produce a second modified ACF (step 1406). The peak-to-mean ratio of the first and second modified ACFs are taken (step 1407 and step 1412). The test for spectral periodicity is concluded by comparing the peak-to-mean values of the ACF, and the FFT of the ACF, against thresholds (step 1413), and a decision is made accordingly (step 1414).

After the spectral periodicity test has been completed, it can be decided (as step 1103 of the decision tree of FIG. 11) if the analysed RFI signal is spectrally periodic (and not mean dominated) or not. The following tests are designed for the two different branches ("yes" and "no") that then follow step 1103. On the spectrally periodic branch (the "yes" branch), frequency varying tests (steps 1104, 1106 and 1107) are performed for the next level, and for the spectrally non-periodic branch (the "no" branch), time periodicity is tested (steps 1105 and 1108).

On the spectrally periodic branch, a horizontal adjustment test (step 1104) and a duty cycle test (step 1106) are performed, so that at decision step 1107 the processes can then branch into either a frequency varying branch ("frequency varying"="yes") or a frequency non-varying branch ("frequency varying"="no"). When testing for frequency variation it is already know (by this stage in the flowchart) that the signal is spectrally periodic.

Figure 12A:
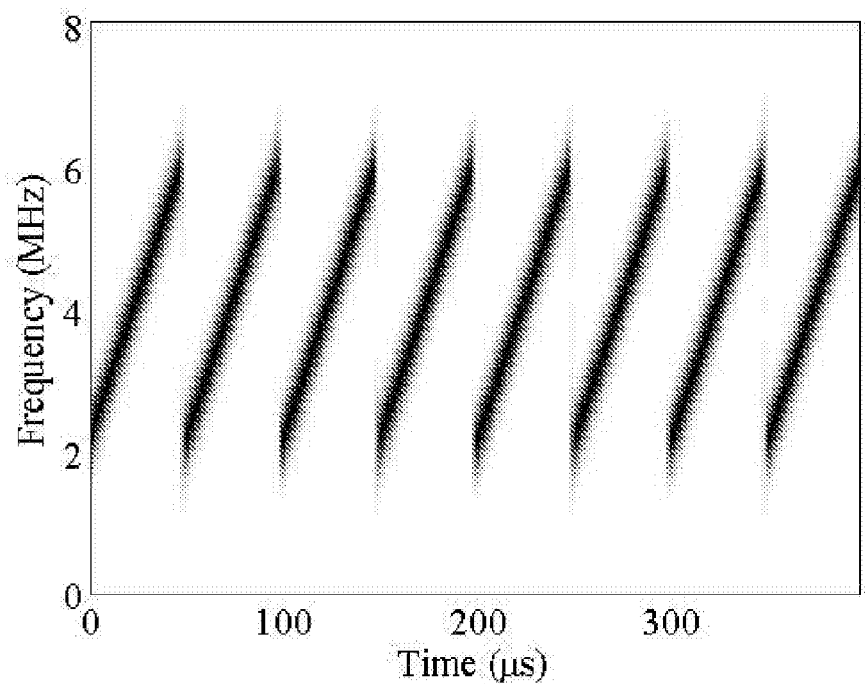
FIGS. 12a to 12e show spectrograms representative of measured signals before being signal processed and after being signal processed in accordance with an embodiment of the invention.
Figure 12B:
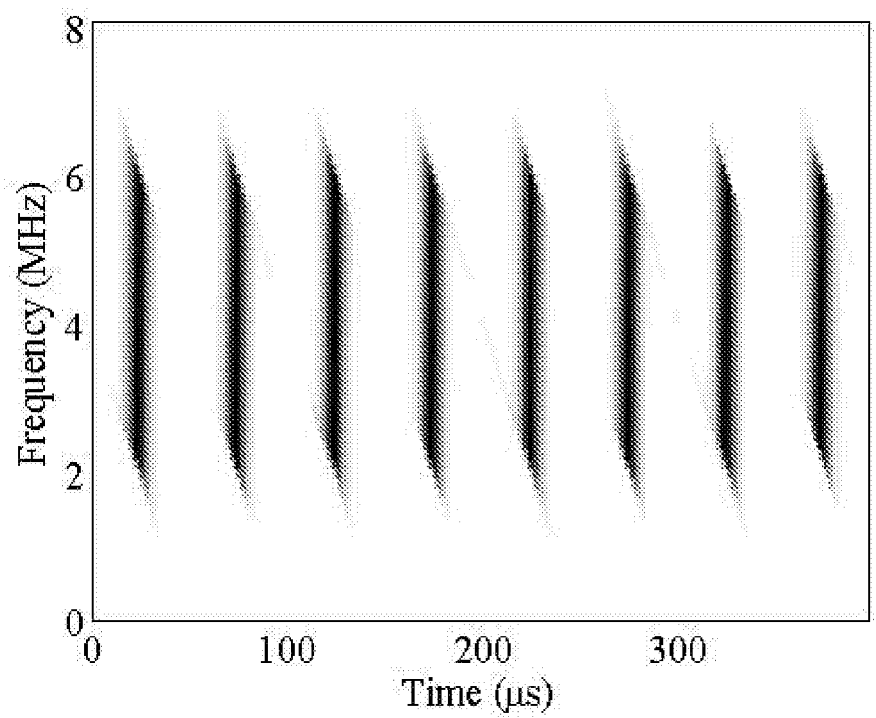

The horizontal adjustment algorithm takes the spectrogram and skews (horizontally adjusts) it. This is accomplished by keeping the bottom row of the spectrogram static, circularly rotating the top row left/right, and rotating the rows in between proportionally depending on how close they are to the top/bottom. FIG. 12*a* shows a graph illustrating an unskewed spectrogram and FIG. 12*b* shows a graph illustrating that same spectrogram but skewed in accordance with the horizontal adjustment algorithm.

The columns of the spectrograms are summed before and after skewing, and then compared to assess whether the new skewed spectrogram has larger peaks. This comparison thus effectively determines whether the skewed spectrogram "lines up" the power better, with the implication that the signal frequencies are progressively increasing/decreasing. The summed columns of cubed values are then each squared and then summed (vertically) before and after horizontal skewing. In other embodiments, they are cubed or raised to another power.

In order to give more priority to high-valued points, the values of the spectrogram is cubed prior to the adjusting. The columns of the spectrograms are summed (vertically) before and after skewing. A skewed summed spectrogram may have larger peaks than the unskewed summed spectrogram and may therefore imply that the skewed summed spectrogram "lines up" the power better than the corresponding unskewed spectrogram. This in turn would imply that the signal frequencies are changing in the signal detected. The horizontally shifted cubed values which have been vertically summed, are then squared and summed (i.e. horizontally) to yield a single value. In other embodiments, they may cubed or raised to another power before this final summing step. The above process is repeated for a large number of different amounts of skewing—both positive and negative—and a decision is made as to whether a given skewed spectrogram lines up the power significantly better than the unskewed spectrogram.

Figure 15A:
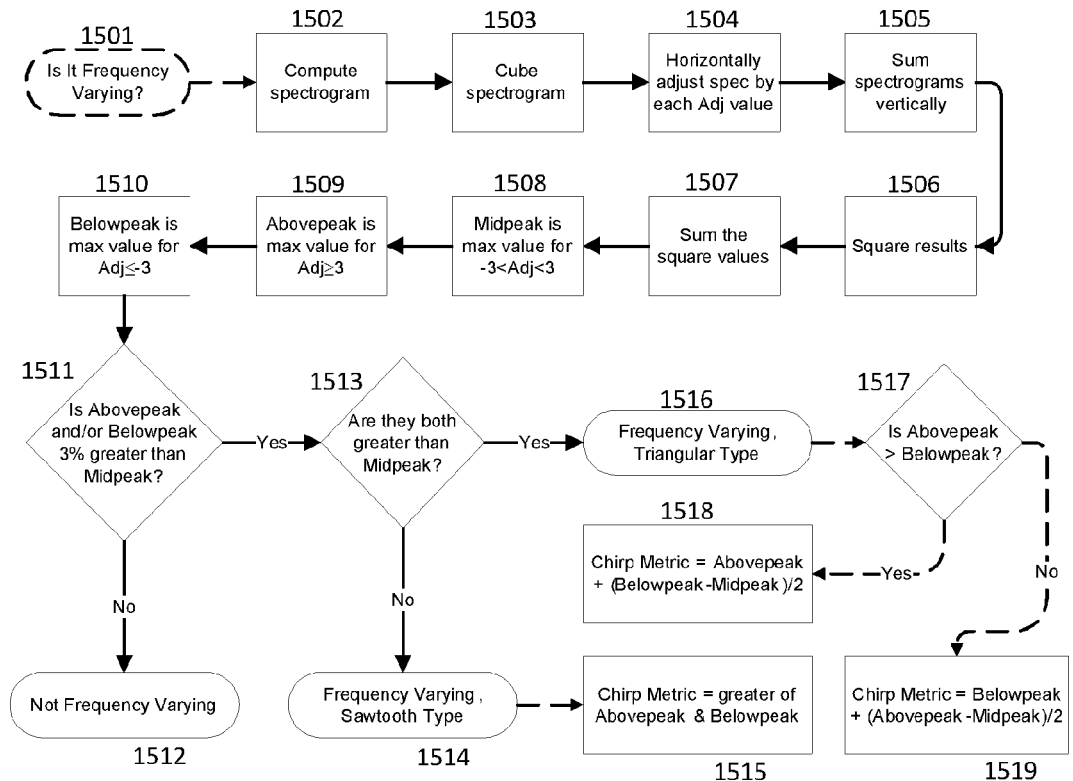
FIG. 15a shows a flowchart for the horizontal adjustment test.
Figure 15B:
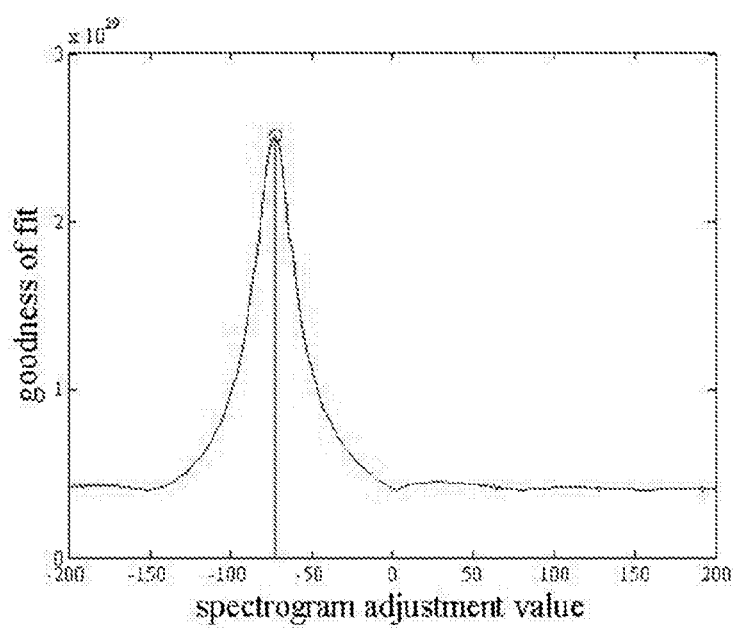
FIG. 15b shows an exemplary graph of the summation following a horizontal adjustment.

FIGS. 15*a* and 15*b* provide further detail concerning the horizontal adjustment test ("skewing") and explains how the calculations are carried out on the spectrogram with different skewing adjustments. With reference to the flowchart of FIG. 15*a*, the spectrogram is computed and the cube of the spectrogram values is computed (steps 1502 and 1503 respectively). The cubed spectrogram is skewed by a set of adjustment values as explained above, to produce a set of modified cubed spectrograms (step 1504). The original cubed spectrogram and the modified cubed spectrograms are all summed vertically (i.e. in the frequency direction) (step 1505) and the results are squared (step 1506). The set of values for each spectrogram are then all summed (step 1507). A "midpeak value" is assigned to the maximum value obtained in the set of modified spectrograms using adjustment values of between −3 and 3 (step 1508). An "abovepeak value" is assigned to the maximum value obtained in the set of modified spectrograms using adjustment values of above or equal to 3 (step 1509). A "belowpeak value" is assigned to the maximum value obtained in the set of modified spectrograms using adjustment values of below −3 (step 1510). If neither the abovepeak and/or belowpeak value is 3% greater than the midpeak value, the signal is not frequency varying (steps 1511 and 1512). If one of the abovepeak and/or belowpeak value is 3% greater than the midpeak value, but not both, the signal is frequency varying, sawtooth type (steps 1511, 1513 and 1514) and the chirp metric is given as the greater of the above peak and the belowpeak values. If both of the abovepeak and/or belowpeak value is 3% greater than the midpeak value, then the signal is frequency varying, triangular type (steps 1511, 1513 and 1516).

For frequency varying, triangular types of signal, if the abovepeak value is greater than the belowpeak value, the chirp metric is given as the result of:

abovepeak+(belowpeak−midpeak)/2.

If not, then the chirp metric is given as the result of:

belowpeak+(abovepeak−midpeak)/2.

If the best adjustment value gives a result that is x % higher than the zero adjustment value, then the signal is determined to be frequency varying. The x % value is simply to give a margin for error. Also, it is important to not consider adjustment values of ±2 as implying a frequency varying signal. Adjustments of less than 3 will be considered to be non-varying.

An example of a resulting set of values from step 1507 of the Horizontal Adjustment Test is illustrated in FIG. 15b. It can be noted that the peak locations (see the peak as shown in FIG. 15b for example) are an estimate of the sweep-rate of the frequency varying signal, which can be used for parameterisation and classification of this RFI signal.

It will be seen that if the Horizontal Adjustment Test were performed on the signal represented by FIG. 12a, with a skew that transforms the spectrogram to the shape shown in FIG. 12b, there would be a strong single peak in the goodness of fit value in a graph of the type shown in FIG. 15 (when the power values line up very well vertically). Such a result implies that the signal detected and represented by the unskewed spectrogram is a chirp signal.

Figure 16:
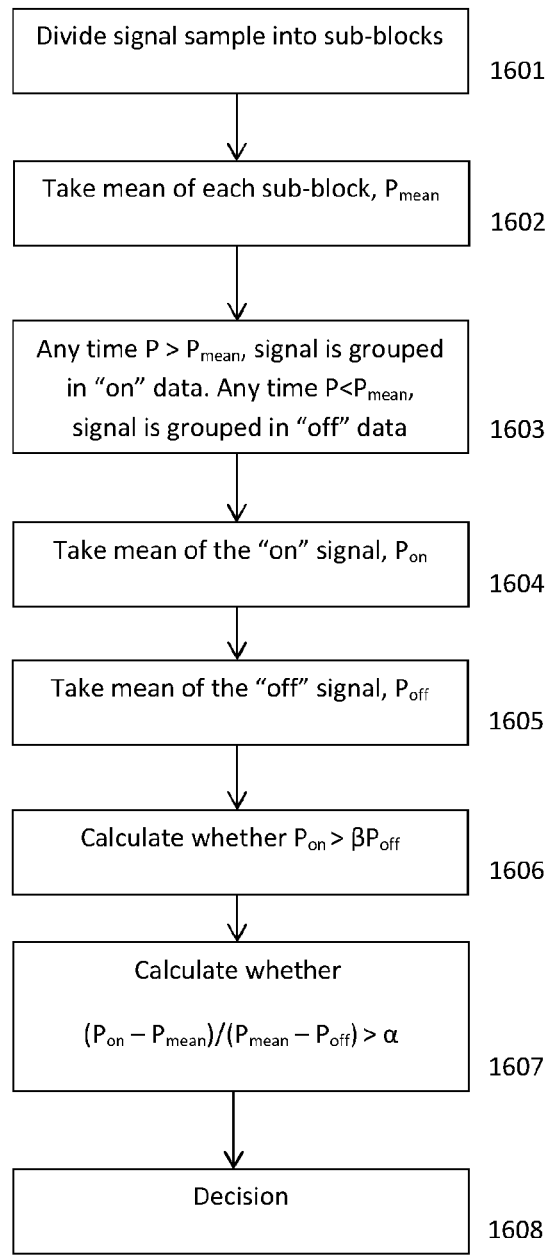
FIG. 16 shows a flowchart for the duty cycle test.

The duty cycle test (step 1106 in FIG. 11) is shown in further detail in the flow-chart of FIG. 16. It is performed in order to decide if the analysed RFI signal is pulsed or not. A large block of samples is split into smaller sub-blocks (step 1601) (in some embodiments with overlap), and the average power of each block is taken. This smoothes out the variance of the background noise, and the quantisation noise. The sub-blocks are smaller than both the "on" and "off" cycles of the pulse chain.

The statistics used in this method are as follows:

The average power $P_{mean}$, is taken for each sub-block (step 1602).

If any time the signal is above $P_{mean}$, it is considered to be "on", otherwise "off" (step 1603)

The "on" signal data is averaged to give $P_{on}$, likewise $P_{off}$ (steps 1604 and 1605).

For the signal to be considered a pulsed signal, it must meet two criteria:

$P_{on} > \beta P_{off}$, where γ is a design parameter (step 1606)

$(P_{on} - P_{mean})/(P_{mean} - P_{off}) > \alpha$, where α is a design parameter (step 1607)

Then a decision is made based on these results (step 1608).

These criteria ensure the fluctuations are greater than the mean, and the duty cycle cannot be too close to unity, as this should be considered to be an "on" signal with random fluctuations (like white noise).

Figure 12C:
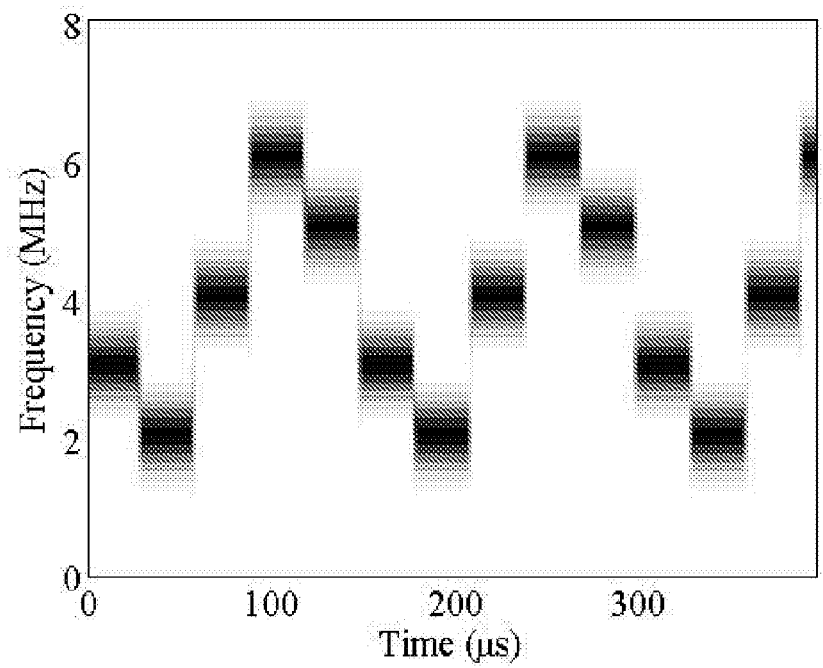
Figure 12D:
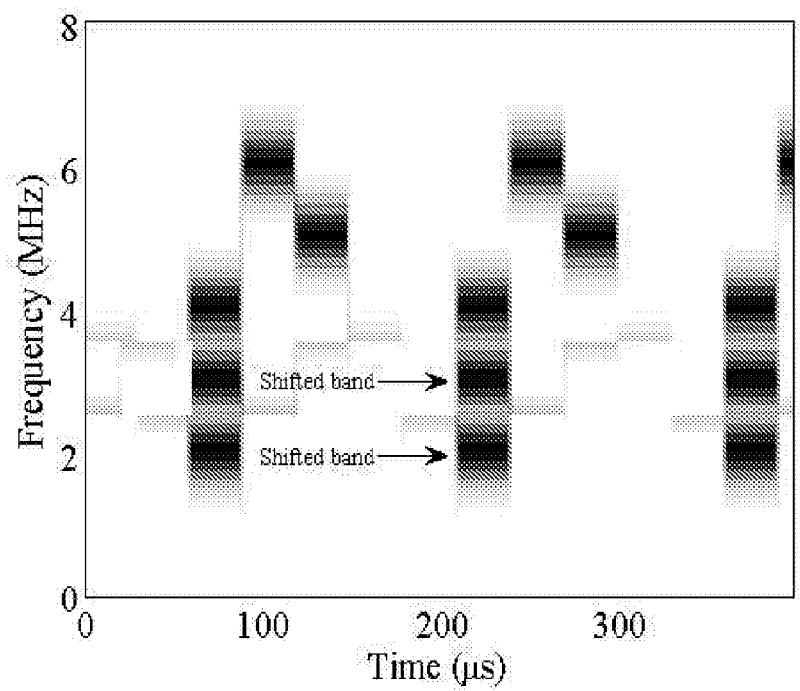
Figure 12E:
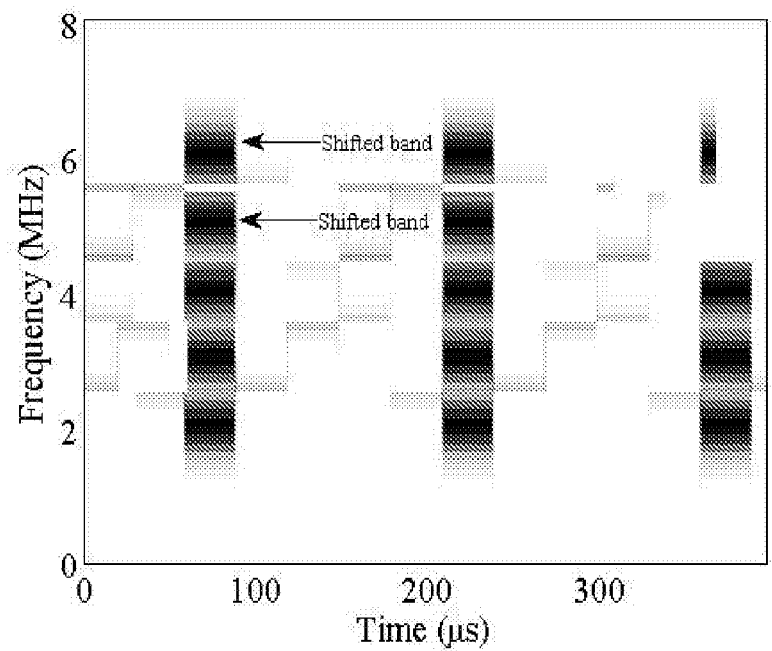

If in the decision tree of FIG. 11 it is decided that the spectrogram has spectral periodicity and is frequency varying, a "shifted sum test" is performed (step 1110) in order to test for a frequency hopping signal. The shifted sum test will now be described in further detail with reference to the flowchart shown in FIG. 17. The test allows to distinguish between a frequency hopped signal and a continuously frequency swept (i.e. Chirp) signal. The shifted sum test is similar to the horizontal adjustment sum method described above. Thus, the spectrogram is taken, and attempts are made to line up the power vertically. The difference lies in the fact that in the shifted sum method, the spectrogram is circularly shifted in strips, rather than skewed. This reflects the nature of a frequency hopped signal. By way of example, a spectrogram of a frequency hopping signal is shown in FIG. 12c. Each strip/frequency band (a collection of adjacent rows) can be circularly rotated until they line up. Each strip of the spectrogram can be bounded by the midpoints between occupied frequencies. This algorithm estimates the frequencies that are present by summing the spectrogram in the horizontal dimension, and picking local peaks. Then, to find out how far to shift each frequency with minimal complexity, each of the local peaks is correlated with the global peak. Groups are again found via the midpoints between frequencies, and groups are moved accordingly. Then the global-peak-band is kept in place, and the remaining bands are ordered from highest value to lowest value. FIGS. 12d and 12e show how strips of the spectrogram may be shifted in steps to better align the power values vertically.

Figure 17:
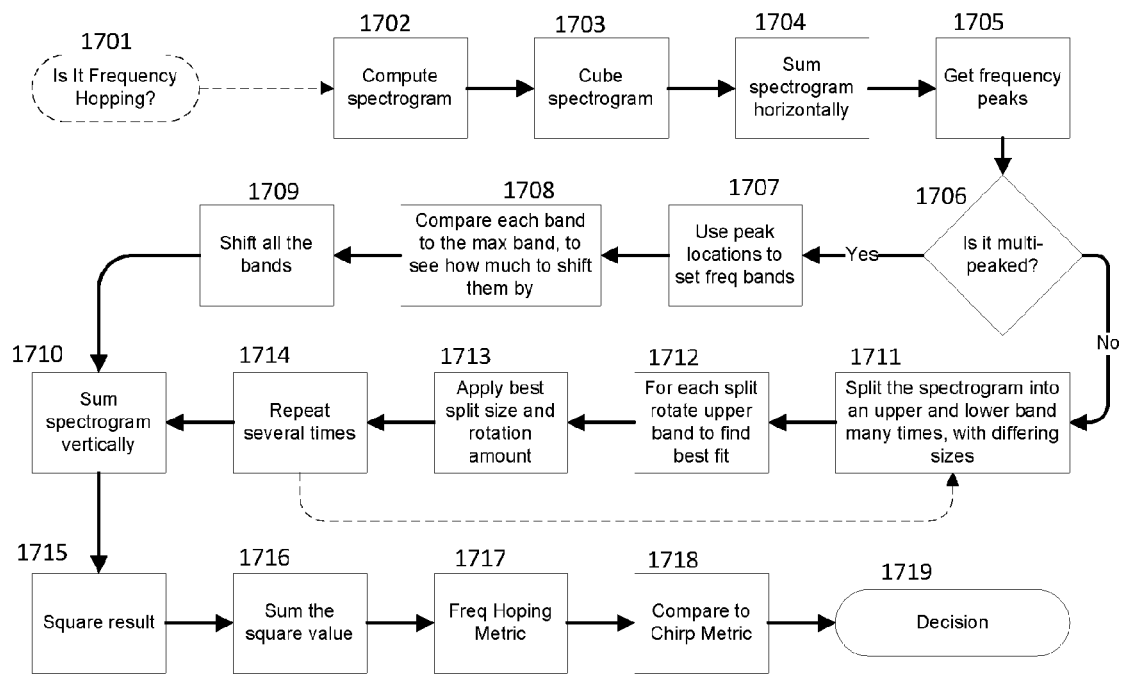
FIG. 17 shows a flowchart for the shifted sum test.

For the shifted sum test (flow-chart as shown in FIG. 17) to result in the decision that the analysed signal is hopping, the shifted sum test must provide a better match than the horizontally adjusted sum method, i.e. it does a superior job of lining up the power.

In the present embodiment, the spectrogram is computed and cubed (steps 1702, 1703) and the cubed spectrogram is summed horizontally (step 1704). The frequency peaks are calculated (step 1705) and it is decided if the spectrogram is multi-peaked (1706).

If it is multipeaked, then the peak locations are used to calculate where the frequency bands of the signal are (i.e. the peaks at the centre of the bands) (step 1707). The original cubed spectrogram is then analysed along the selected frequency bands and compared to the band with the highest peak from the horizontal summation (step 1708). Each band is then shifted horizontally and circularly (step 1709).

If the spectrogram is not multipeaked, the spectrogram is split into upper and lower bands with varying sizes, and a set of these is generated (step 1711). For each pair of bands, the upper band is shifted circularly and horizontally to find the best fit (i.e. the closest match of peaks in each band) (step 1712). The upper and lower bands are each then split again as in step 1711 and the process is repeated several times (step 1714).

In both the multipeaked and the non-multipeaked cases, the spectrogram is summed vertically (step 1710) and the set of summations are squared (step 1715). The squared set are then summed (step 1716) to give the frequency hopping metric (step 1718).

The frequency hopping metric and the chirp metric are compared to decide if the chirp fit is better than the frequency hopping fit (step 1111 in FIG. 11).

In case the analysed signal is not spectrally periodic, it is still important to differentiate between noise and the pseudo-random noise like Code Division Multiple Access (CDMA) signals. This is because CDMA is the modulation scheme used by GNSS signals, and also spoofing RFIs and some malicious jammers. It is worth noting that this test only needs to distinguish between a true random signal, which could be wideband (WB) or narrowband (NB) or single-tone (ST), and a pseudo-random signal, such as CDMA. Therefore, whilst signals such as chirp may well look periodic in the time domain, this test does not need to differentiate between such signals and white noise.

The obvious feature of a pseudo-random CDMA signal over white noise is that it is periodic in time. The ACF can be used to confirm the presence of a CDMA signal. However, there are difficulties relating to this approach: in order to test for periodicity, the test window must be greater than one code period.

Figure 18:
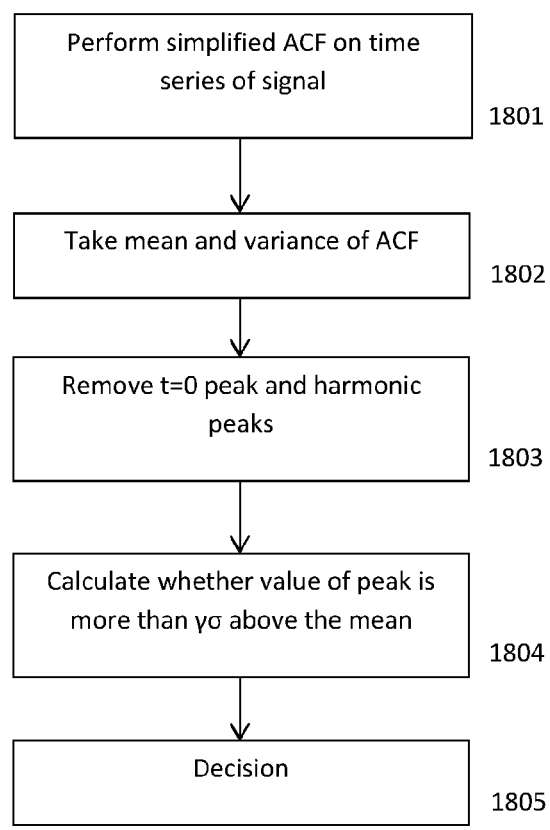
FIG. 18 shows a flowchart for the time periodicity test.

A full ACF can be performed over the full analysing window over the signals, if the computational capability and latency is not constrained, for example at the central server 100. In the present embodiment, the time periodicity test is performed at the primary probe 104, and so a simplified ACF computation method is performed as shown in FIG. 18. This method takes a small chunk of the time series of the signal, and slides this chunk over the entire analysing window of the signal (step 1801). The mean and variance are taken (step 1802), and the first peak (at t=0) is removed (step 1803) (if multiple harmonic peaks are present, they are removed from consideration as well, in order to obtain a more accurate estimate of the variance of the noise). For the signal to be characterised as time-periodic the peak must be greater than $\gamma\sigma$ above the mean, where $\gamma$ the design parameter and $\sigma$ is the estimated standard deviation. Therefore $\gamma\sigma$ is calculate and compared to the mean (step 1804), and a decision is made based on whether it is above the mean (step 1805).

It will therefore be seen that the flow-chart decision tree shown in FIG. 11 provides a means for classifying a GNSS jamming signal as belonging to one of 9 different classes (types) of jamming signal.

The probe 104 then takes the outputs of the RFI detection fusion algorithm, and the RFI classification algorithm, together with pre-defined priority metrics to generate either a low-latency Event Alert Message or a latency-tolerant Report Message. These metrics are able to be re-configured and updated by the control of the central server 100. For instance, one criterion is that if the detected RFI is classified as a "Chirp Signal", an Alert Messages needs to be generated and transmitted to the central server immediately. This is due to the fact that most of the current malicious jammers generate "Chirp Signals", and the impact to the GNSS services are extremely damaging.

In the present embodiment, the probe 104 also manages the scheduling of the Event Alert/Report Messages transmission. In case an Alert Message has been generated, this entity will allocate the highest priority to transmit the message to the central server 100. In case it is a normal priority level message, it will transmit the message when the computation and communication resources are available. This differentiation of the priority of the events minimizes the latency with which urgent events are received at the central server 100, so that corresponding actions can be taken in a timely manner. The invented differentiation of the messages guarantees the best performance with relative low communication costs.

In order to be robust against possible temporary loss of communication links, individual reports are also stored in the data storage on the primary probe 104, until an acknowledgement message has been received by the probe 104 from the central server 100/hub 104 that the message has been successfully received and decoded. In case of a temporary loss of communication links, multiple Event Alerts/Reports are stored in the memory of the probe 104, and are transmitted as soon as the communication links become available again.

Whilst the present invention has been described and illustrated with reference to particular embodiments, it will be appreciated by those of ordinary skill in the art that the invention lends itself to many different variations not specifically illustrated herein. Some such variations will now be described, by way of example only.

It will for example be appreciated that certain aspects of the above-described embodiments may have application separately from other aspects. For example, the decision tree used to classify the type (or class) of jammer signal may be changed in structure, or indeed not used at all, when detecting or seeking to locate a known jamming signal. Different network topology may be utilised. Secondary probes could connect to the central server via local hubs for example.

The detection algorithm described above use six scalar values representative of the confidence of detection of FR interference (or jamming signal) as determined by six different tests in a fusion test to give a single determination of detection of a jamming signal. Fewer tests could be used. Different, or further, combinations of the individual tests may also be performed.

Where in the foregoing description, integers or elements are mentioned which have known, obvious or foreseeable equivalents, then such equivalents are herein incorporated as if individually set forth. Reference should be made to the claims for determining the true scope of the present invention, which should be construed so as to encompass any such equivalents. It will also be appreciated by the reader that integers or features of the invention that are described as preferable, advantageous, convenient or the like are optional and do not limit the scope of the independent claims. Moreover, it is to be understood that such optional integers or features, whilst of possible benefit in some embodiments of the invention, may not be desirable, and may therefore be absent, in other embodiments.

The invention claimed is:

1. A method of classifying a GNSS jamming signal:
   at a computer processor of a GNSS jamming signal detector, analysing a spectrogram of an incoming GNSS signal using a tree-based decision process, the incoming GNSS signal being received at a GNSS signal antenna of the GNSS jamming signal detector; and
   at the computer processor, in response to the analysing, selecting one of a finite number of types of jamming signal to classify the GNSS signal as a potential type of GNSS jamming signal;
   wherein one of the decisions in the tree is whether the spectrogram has spectral periodicity.

2. A method according to claim 1, wherein the method includes a step of modifying the spectrogram prior to using it in the spectral periodicity decision, the modifying step including stripping out instances of low power.

3. A method according to claim 1, wherein the method includes a step of modifying the spectrogram prior to using it in the spectral periodicity decision, the modifying step including auto-correlating the spectrogram in the time domain.

4. A method according to claim 1, wherein the method includes a step of Fourier Transforming the spectrogram so as to transform time domain information into frequency domain information.

5. A method according to claim 1, wherein the method is performed such that if the result of the decision on whether the spectrogram has spectral periodicity is that it does have spectral periodicity a step of testing for frequency variation is performed, whereas that if the result of the decision on whether the spectrogram has spectral periodicity is that it does not have spectral periodicity the step of testing for frequency variation is not performed.

6. A method according to claim 1, wherein the method includes a step of testing for frequency variation in the jamming signal and the step includes skewing the spectrogram of the jamming signal so as to shift data by different amounts along the time axis according to the frequency, wherein if such a skewed spectrogram has better defined grouping of signal components, in the time domain, the jamming signal is deemed to have frequency variation.

7. A method according to claim 1, wherein the method includes a step of testing to distinguish between one or more types of jamming signal from one or more different types wherein the method includes shifting different strips of the spectrogram by different amounts along the time axis, each such strip concerning at least one frequency band covering multiple different frequencies, and such that the spectrogram then has better defined grouping of signal components, in the time domain.

8. A method according to claim 1, wherein the method is performed such that if the result of the decision on whether the spectrogram has spectral periodicity is that it does not have spectral periodicity a step of testing for time periodicity is performed, whereas that if the result of the decision on whether the spectrogram has spectral periodicity is that it does have spectral periodicity the step of testing for time periodicity is not performed.

9. A GNSS jamming signal detector comprising
the GNSS signal antenna;
a GNSS receiver; and
a computer processor with associated software that when executed on the processor causes the detector to perform those steps performed by the computer processor as claimed in claim 1.

10. A detector according to claim 9, wherein the detector is a fixed position detector.

11. A detector according to claim 9, wherein the detector includes a wireless communication module facilitating communication with at least one of a central server and a further like detector.

12. A network of detectors according to claim 11 each being arranged to communicate with at least one of a central server and another detector in the network.

13. A computer software product that when executed on a processor of a GNSS detector causes the detector to perform those steps as are performed by the computer processor as claimed in claim 9.

14. A central server programmed to control and communicate with the network of detectors of claim 12.

15. A computer software product that when executed on a computer server performs the function of the server as claimed in claim 14.

16. A system for detecting a GNSS jamming signal, the system comprising a central server, a plurality of fixed position signal detectors, a plurality of local hubs and a plurality of mobile signal detectors, wherein
at least one of the fixed position signal detectors is configured to communicate with the central server and at least one of the local hubs, and
at least one of the local hubs is configured to communicate with at least one of the fixed position signal detectors and the central server, and
at least one of the mobile signal detectors is configured to communicate with the central server, wherein
the central server is configured to collect data from at least one fixed position signal detector and at least one local hub, and perform central data processing to classify the GNSS jamming signal as one of a finite number of types of jamming signal.

17. A system according to claim 16, wherein at least one fixed position signal detector includes a wireless communication module for facilitating communication with the central server and at least one of the local hubs.

* * * * *